United States Patent
Hayes, Jr. et al.

(10) Patent No.: US 6,283,858 B1
(45) Date of Patent: Sep. 4, 2001

(54) METHOD FOR MANIPULATING IMAGES

(75) Inventors: Carl Douglas Hayes, Jr.; Lucy Johnson Hayes; Laura Yelder Johnson, all of Silver Spring, MD (US)

(73) Assignee: BGK International Incorporated, Silver Springs, MD (US)

( * ) Notice: Subject to any disclaimer, the term of this patent is extended or adjusted under 35 U.S.C. 154(b) by 0 days.

(21) Appl. No.: 08/950,873

(22) Filed: Aug. 15, 1997

Related U.S. Application Data

(63) Continuation-in-part of application No. 08/806,059, filed on Feb. 25, 1997, now Pat. No. 5,960,099.

(51) Int. Cl.$^7$ .................................................. A63F 9/24
(52) U.S. Cl. ............................................ 463/31; 345/418
(58) Field of Search .................................. 463/1, 30–34, 463/43, 36; 700/91; 273/459–461; 345/418, 433, 429, 435, 438, 468–469, 473; 382/118

(56) References Cited

U.S. PATENT DOCUMENTS

| | | | |
|---|---|---|---|
| 4,276,570 | 6/1981 | Burnson et al. ..................... 382/276 |
| 4,521,014 | * 6/1985 | Sitrick . | |
| 4,539,585 | * 9/1985 | Spackova et al. . | |
| 4,572,509 | * 2/1986 | Sitrick . | |
| 4,688,105 | * 8/1987 | Bloch et al. . | |
| 4,710,873 | * 12/1987 | Breslow et al. . | |
| 4,791,581 | * 12/1988 | Ohba . | |
| 5,299,301 | 3/1994 | Nohmi et al. ....................... 345/431 |
| 5,307,452 | 4/1994 | Hahn et al. ......................... 345/432 |
| 5,319,742 | 6/1994 | Edgar .................................. 345/431 |
| 5,467,441 | 11/1995 | Stone et al. ......................... 345/433 |
| 5,469,536 | 11/1995 | Blank .................................. 345/431 |
| 5,479,529 | 12/1995 | Nakagawa ........................... 382/118 |
| 5,490,238 | 2/1996 | Watkins .............................. 345/422 |
| 5,533,186 | 7/1996 | Tanahashi et al. .................. 345/507 |
| 5,553,864 | * 9/1996 | Sitrick ................................. 463/31 |
| 5,937,081 | * 8/1999 | O'Brill et al. ...................... 434/94 |

FOREIGN PATENT DOCUMENTS 586082  9/1994  (EP) .

OTHER PUBLICATIONS

Computer Graphics Proceedings, Annual Conference Series, "Realistic Modeling for Facial Animation", Lee et al, pp 55–61, 1995.*

* cited by examiner

*Primary Examiner*—Mark Sager
(74) *Attorney, Agent, or Firm*—Richard C. Litman

(57) ABSTRACT

A system and method is disclosed for manipulating images. The system includes a digital computer, input and output peripherals, and a program which provides a plurality of functions for manipulating various images. The images are processed to generate unique objects which may be modified by an operator. The program also allows integration and data transfer to various systems including video games, other digital computers, etc. The system may be used to transfer data to the video game in order to replace characters with the actual image of the player. The system may also be used to perform animation of an image, simulate facial movement resulting from speech, and simulate cosmetic reconstruction of a body portion in real time. The program is further capable of generating three-dimensional representations of an image being manipulated.

14 Claims, 22 Drawing Sheets

METHOD FOR MANIPULATING IMAGES

CROSS-REFERENCE TO RELATED APPLICATION

This application is a Continuation-in-Part of U.S. patent application Ser. No. 08/806,059, filed Feb. 25, 1997, now U.S. Pat. No. 5,960,099.

BACKGROUND OF THE INVENTION

1. Field of the Invention

The present invention relates to image processing systems and more particularly to an image processing system which allows manipulation of facial features.

2. Description of the Prior Art

Recent advancements in computer technology have provided users with abilities and conveniences previously unimagined. One well known application of computers is that of generating and manipulating images. Such images range from plots of mathematical functions and relationships to detailed drawings, all of which are generated for viewing on a display screen. In other instances, an image may be digitized for later enhancement or alteration on the computer system. Since the image is in digitized form, it may be stored, transmitted, and printed as any other form of computer information or data.

It is common to execute painting programs in the memory of a digital computer in order to create an environment wherein images may be created, displayed, and manipulated using a selection device such as a mouse or stylus. The painting program reconfigures the memory of the digital computer in a manner analogous to that of a canvas upon which an image is created. This information is transmitted to a display screen for instantaneous viewing by the user. The program allows the mouse to function as a normal selection device or a paintbrush, based on the relative position of the mouse on the display screen. One area of the display screen may be used to select operations designed to manipulate the image. In another area of the display screen, the mouse functions as a cursor having a user-selectable brush image.

A typical painting program will provide the user with numerous options. For example, various colors may be selected when painting. New colors may be created by mixing available colors. Various brush sizes and shapes may be selected. There are several basic tools which the user may select to create the image. A pencil tool allows a user to draw lines in freehand using the mouse. A paint tool is used to add paint to a specified area while an eraser tool will remove painted portions of an the image. Basic geometric patterns such as circles, ellipses, rectangles, squares, may also be created with ease. Finally, a magnifying tool is often available to allow detailed manipulation of a portion of the image.

While paint programs provide user with numerous tools for creating and manipulating images, they do not allow the creation or manipulation of facial features. Nowadays, it is often desirable to provide children with customized gifts. Such gifts often include personalized storybooks where the main character shares the child's name, for example. These storybooks are usually available in digital format so that the child may use the book in conjunction with a digital computer. While a common name provides a certain bond between the child and the main character, it should be appreciated that this bond could be further increased if the main character was also in the image of the child. Thus, the child would feel as though the storybook were created especially for them and about them.

There are numerous methods and systems currently available for manipulating images using a digital computer. For example, U.S. Pat. No. 4,276,570 issued on Jun. 30, 1981 to Burson et al. discloses a method and apparatus for producing an image of a person's face at a different age. In order to simulate the appearance of a different age on a person's face, a picture of an old face and a corresponding young face are recorded and the differences between the old and young face are found and recorded. A picture of the person's face to be simulated at a different age is then recorded, modified with the differences, and the image resulting after modification is displayed.

U.S. Pat. No. 5,299,301 issued on Mar. 29, 1994 to Nohmi et al. discloses an image displaying method and apparatus. The attribute data of a designated region on the displayed image is stored. Next, the attribute of a partial image corresponding to the region designated on the display screen is retrieved, or the region of the partial image having a predetermined attribute that includes the attributes retrieved by the first step is picked.

U.S. Pat. No. 5,307,452 issued on Apr. 26, 1994 to Hahn et al. discloses a method and apparatus for creating, manipulating, and displaying images. The invention permits a user to manipulate a high resolution source image through interaction with a lower resolution display image. User operations are interpreted by a paint system processor and executed on the source image in real time. A combiner feature allows operations to be described as mathematical expressions, where operands are images and operators are chosen from a list of special related operators. The source image is stored in location A and the current user operation is executed in location B. The combiner feature joins images A and B to display the result on the display.

U.S. Pat. No. 5,319,742 issued on Jun. 7, 1994 and European Patent Application # 586,082 published on Apr. 9, 1994, both to Edgar, disclose an image enhancement with mask having fuzzy edges. A mask having at least two areas is defined over an image. The mask pixels are mapped with an error diffusion or dithering process in order to mix the mask pixels between the areas. Image pixels corresponding in position to the mask pixels are mapped to color palettes selected for the two areas. An image effect is applied to the color palette of the unmasked area. The error diffusion thus provides a fuzzy edge to the mask and the process may be accomplished with a minimum number of states.

U.S. Pat. No. 5,467,441 issued on Nov. 14, 1995 to Stone et al. discloses a method for operating on objects in a first image using an object-based model data structure to produce a second contextual image having added, replaced, or deleted objects. A processor-controlled machine allows a user to operate on an object-based model data structure from which a first image has been produced in order to apply any of a number of spatially and temporally bounded changes to the first image in a second image which is displayed in the spatial context of the first image. The method is implemented as an enhancement to the functionality of an application program, such as a graphical object editor. The method performs the operations on a copy of the model data structure, thus permitting the user to instantly preview changes to an image before actually applying those changes.

U.S. Pat. No. 5,469,536 issued on Nov. 21, 1995 to Blank discloses an image editing system including masking capability. The system allows editing of digital images in three dimensions and includes a computer for storing a digital image of an object and a background, as well as at least one additional background image. Based upon the difference between the hues of the edge of the object and the surrounding background and a predetermined hue difference, the computer locates the edge of the object and removes portions of the image which are outside the edge. The object can then be combined with a preselected one of the other background images so as to form a composite image.

U.S. Pat. No. 5,479,529 issued on Dec. 26, 1995 to Nakagawa et al. discloses a character and fortune telling method and apparatus for hobby use. The apparatus includes an input unit for generating a two-dimensional image based on a person's face. A feature extraction unit is provided for extracting the coordinates and distances expressing the shapes and positions of the face from the two-dimensional image. The apparatus further includes an output unit for producing personal information about a person from the extracted features and for directing the information to an output device.

U.S. Pat. No. 5,490,238 issued on Feb. 6, 1996 to Watkins discloses an attribute blending system for composing computer-graphic images from objects. Objects contending for representation in pixels of a graphics display are selectively awarded a fractional area within a pixel based on: coarse calculations in the Z dimension, aggregate demands of the objects, and blending techniques free of binary position resolutions. The area occupied by a polygon within a pixel is represented using a single number in the form of a variable. For example, a value of "0" may be used to indicate that no area is occupied within the pixel, while a value of "255" may indicate that the entire area is occupied. Blending techniques with attendant antialiasing are used to avoid calculations in the Z dimension.

U.S. Pat. No. 5,533,186 issued on Jul. 2, 1996 to Tanahashi et al. discloses an image filing method based on symbol retrieval condition. A plurality of images are registered one by one and subsequently retrieved by adding a retrieval condition so as to minimize the registration and retrieval times. A plurality of symbols for featuring objects in the images are preset, and the images are registered in accordance to the selected symbols. At the image retrieval time, the symbols are selected, and the images corresponding to the selected symbols are read out.

None of the above inventions and patents, taken either singularly or in combination, is seen to describe the instant invention as claimed.

SUMMARY OF THE INVENTION

Accordingly, it is a principal object of the invention to provide a system for manipulating images.

It is another object of the invention to provide a method for customizing video games.

It is a further object of the invention to provide a method for performing animation.

It is a still further object of the invention to provide a method of simulating cosmetic reconstruction.

It is an object of the invention to provide improved elements and arrangements thereof in a system and method for manipulating images for the purposes described which is inexpensive, dependable and fully effective in accomplishing its intended purposes.

In accordance with an object of the invention, a system is provided for manipulating images. The system includes a digital computer having a display device, a selection device such as a mouse or stylus, memory, and data storage and retrieval devices such as disk drives. An input means such as a scanner, digital camera, or similar device should preferably be operatively coupled to the digital computer. The input means allows processing photographs or physical images into data suited for manipulation by the digital computer. Alternatively the data may be provided in digital format on magnetic, optical, or semiconductor media accessible by the digital computer.

A program, executable in the memory of the digital computer, is provided for reconstructing a digital image based on the data. The program provides a plurality of options which allow an operator to modify various features on the digital image. The program allows enlargement and reduction of the digital image. The program also allows integration and data transfer to various systems including video games, digital computers, etc. In one aspect of the invention, the data may be transferred to the video game to replace characters with the actual image of the player.

In accordance with another object of the invention, a method is provided for customizing video games. The image of a character from the video game is input into the digital computer. Depending on the specific views of the character within the video game, it may be necessary to input more than one image. For example, a frontal view and a side view. The image of the character is displayed on a viewing device and a coordinate grid is superimposed thereon. Point coordinates corresponding to facial features of the character are identified using geometric shape inferences. Mathematical equations and formulas are applied to the geometric shape inferences in order to determine the natural layout of the character's facial features. Once the natural layout of the character's face is determined, the mathematical equations may be further applied to manipulate the geometric shape inferences, thereby simulating various facial expressions such as a smile or a frown. Furthermore, the image of the character may consist of two-dimensional or three-dimensional data, depending on the particular video game being used. For example, many of the newer games incorporate fully rendered characters to provide more realistic play.

The image of the player is now entered into the digital computer. Depending on the specific views of the character within the video game, it may be necessary to input more than one image, similar to the images of the character. The image of the player is also displayed on a viewing device and a coordinate grid is superimposed thereon. Point coordinates corresponding to facial features of the player are identified using geometric shape inferences. Mathematical equations and formulas are applied to the geometric shape inferences in order to determine the natural layout of the player's facial features. Once the natural layout of the player's face is determined, the mathematical equations may be further applied to manipulate the geometric shape inferences, thereby simulating various facial expressions such as a smile or a frown.

At this point, the facial features of the character are replaced with the facial features of the player on each image. The resulting images are saved as frames or similar formats retrievable by the video game. Since a relationship exists between the features of the character and the player, the resulting image virtually replaces the image of the character with that of the player within the game. In preferred embodiments of the invention, the player may be provided with the option to use his image in the game. Furthermore, a plurality of images corresponding to different family members may be used. Thus, in games which allow more than one player, various individuals may play with or against each other.

In accordance with another object of the invention a method is provided for performing animation. An image is entered into the digital computer. The image should correspond to a view of a person or thing which will be primarily shown during the animation sequence. Alternatively, two or three views may be entered and the program will generate a three-dimensional image. The image is displayed on a viewing device and a coordinate grid is superimposed thereon. Point coordinates corresponding to facial features are identified using geometric shape inferences. Mathematical equations and formulas are applied to the geometric shape inferences in order to determine the natural layout of the facial features. Once the natural layout of the face is determined, the mathematical equations may be further applied to manipulate the geometric shape inferences to simulate facial expressions.

The program accesses a database containing common linguistic rules. The linguistic rules identify specific movements of the face when particular words, sounds, or letter combinations are spoken. A plurality of facial expressions are created based on the different linguistic rules. As the facial expressions are created, they are saved within a library file. A sequence of frames is subsequently generated by sequentially retrieving different frames based on text supplied in order to simulate speech by the image. Since the facial expressions of the image are modified according to the linguistic rules, an animation of the image is generated which simulates motion of facial features just as in real life. The animated speech sequences can also be saved so that they may be played automatically in response to predetermined inputs.

In accordance with another object of the invention, a method is provided for simulating cosmetic reconstruction. The image of a desired body portion is entered into the digital computer. The body portion can correspond to the legs, face, etc. Depending on the specific body portion upon which the simulation will be performed, a three-dimensional field of view may be generated by the program. The image is displayed on a viewing device and a coordinate grid is superimposed thereon. Point coordinates corresponding to key features are identified using geometric shape inferences. Mathematical equations and formulas are applied to the geometric shape inferences in order to determine the natural layout of the key features of the body portion. Once the natural layout of the key features are determined, the mathematical equations may be further applied to manipulate the geometric shape inferences to simulate various movements. The specific features to be modified are identified. An input device such as a mouse, stylus, touch screen, etc., coupled to the digital computer is used to adjust the position of the landmark points of the features to be modified. Mathematical calculations are applied to determine passive changes to areas surrounding the changed feature. The program then generates a modified image which incorporates changes to the body portion.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
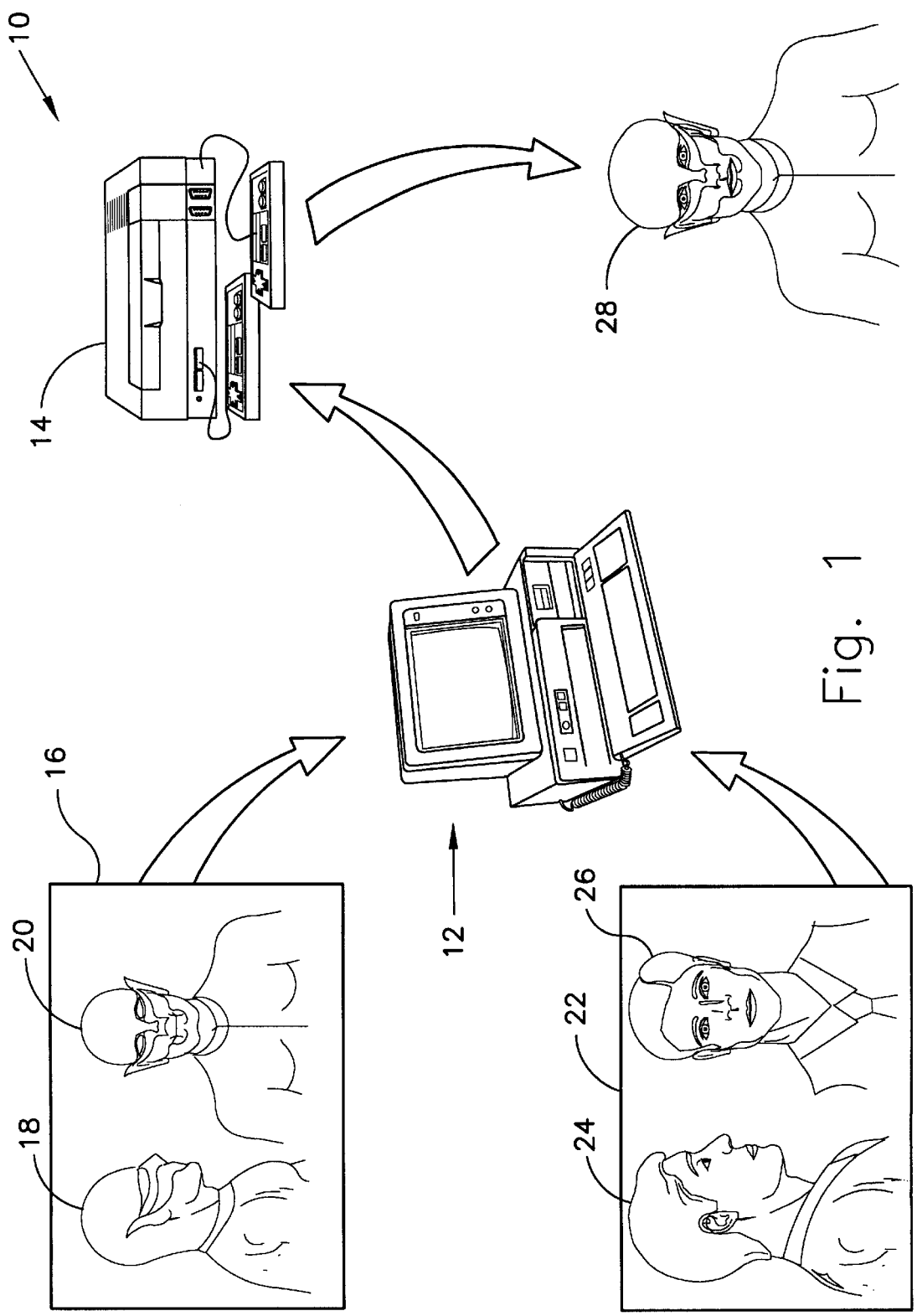
FIG. 1 is a process chart illustrating the procedure for customizing video games according to the present invention.

With reference to the drawings and initially to FIG. 1, a system 10 is shown for manipulating images. The system 10 includes a digital computer 12 having a display device, a selection device such as a mouse or stylus, memory, and data storage and retrieval devices such as a disk drive. The system 10 may additionally include various input and output peripherals such as scanner, digital camera, printer, etc. FIG. 1 also illustrates a video game machine 14 which may be coupled to the digital computer 12. The input peripherals allow of processing photographs or physical images into data suited for manipulation by the digital computer 12. Alternatively the data may be provided in digital format on magnetic, optical, or semiconductor media accessible by the digital computer 12.

The image of a character 16, such as those used in video games via the video game machine 14, is entered into the digital computer 12 by appropriate input peripherals. Similarly, the image of a player 22 is entered into the digital computer 12 by appropriate input peripherals. Preferably, the image of the character 16 consists of a side view and a front view 18, 20, and the image of the player 22 consists of a side view and front view 24, 26. Furthermore, data corresponding to the image of the character 16 and the image of the player 22 may be entered directly into the digital computer 12.

The digital computer 12 executes a program which reproduces an image of the character 16 and an image of the player 22 on the display device. The program is capable of generating a three-dimensional representation of the image if sufficient views are provided. The program also allows an operator to manipulate the data in order to modify various features of the image reproduced on the display device. As seen in FIG. 1, a resulting digital image 28 may be created which incorporates features from the image of the character 16 and the image of the player 22. The operator may also elect to enlarge or reduce the resulting digital image 28. As used herein, "character" refers to any image which is retrieved from the video game machine 14, or any fictional image not provided by the operator of the system. "Player" refers to any image which is entered into the digital computer 12. For example, the image of a family member who is not currently playing the game, or the image of particular animal or object which is provided by the operator of the system.

Once the operator is satisfied with the resulting digital image 28, various options are available. The operator may choose to paste it electronically to a document or desired program, or the data corresponding to the resulting digital image 28 may be saved as a file accessible by other programs, etc. As illustrated in FIG. 1, data corresponding to the resulting digital image 28 is transferred to the video game machine 14. The operator may also use an attached output device to create printouts. Thus, in this particular application, the resulting digital image 28 is accessible by the video game machine 14 so that when the game is played, the image of the character is replaced by the resulting digital image 28. This effectively allows a child to enter his/her image into the digital computer 12 for substitution with characters in the video game. When the game is played, the child sees himself or herself in action.

Figure 2:
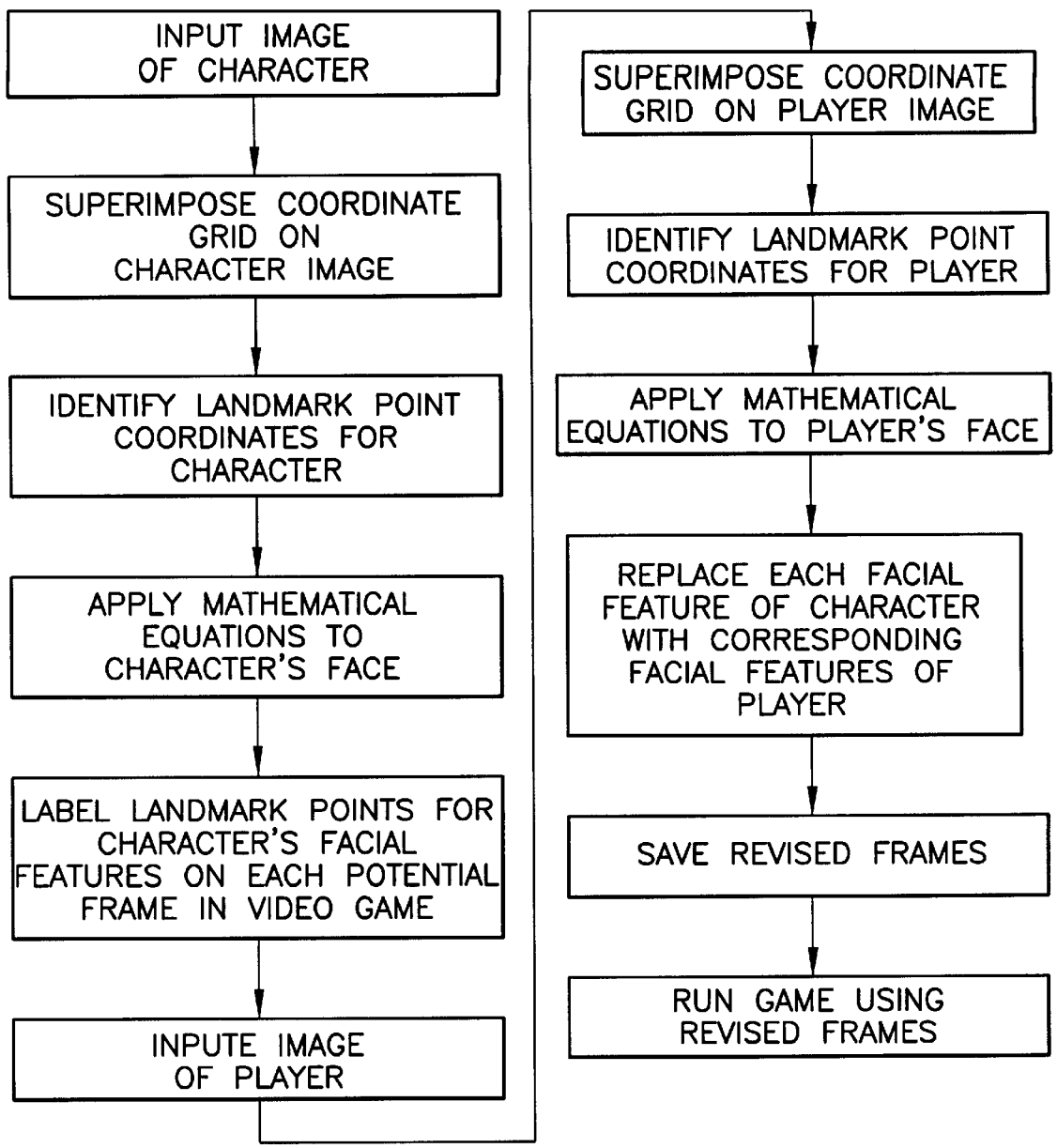
FIG. 2 is a flowchart illustrating the steps for customizing video games.
Figure 4:
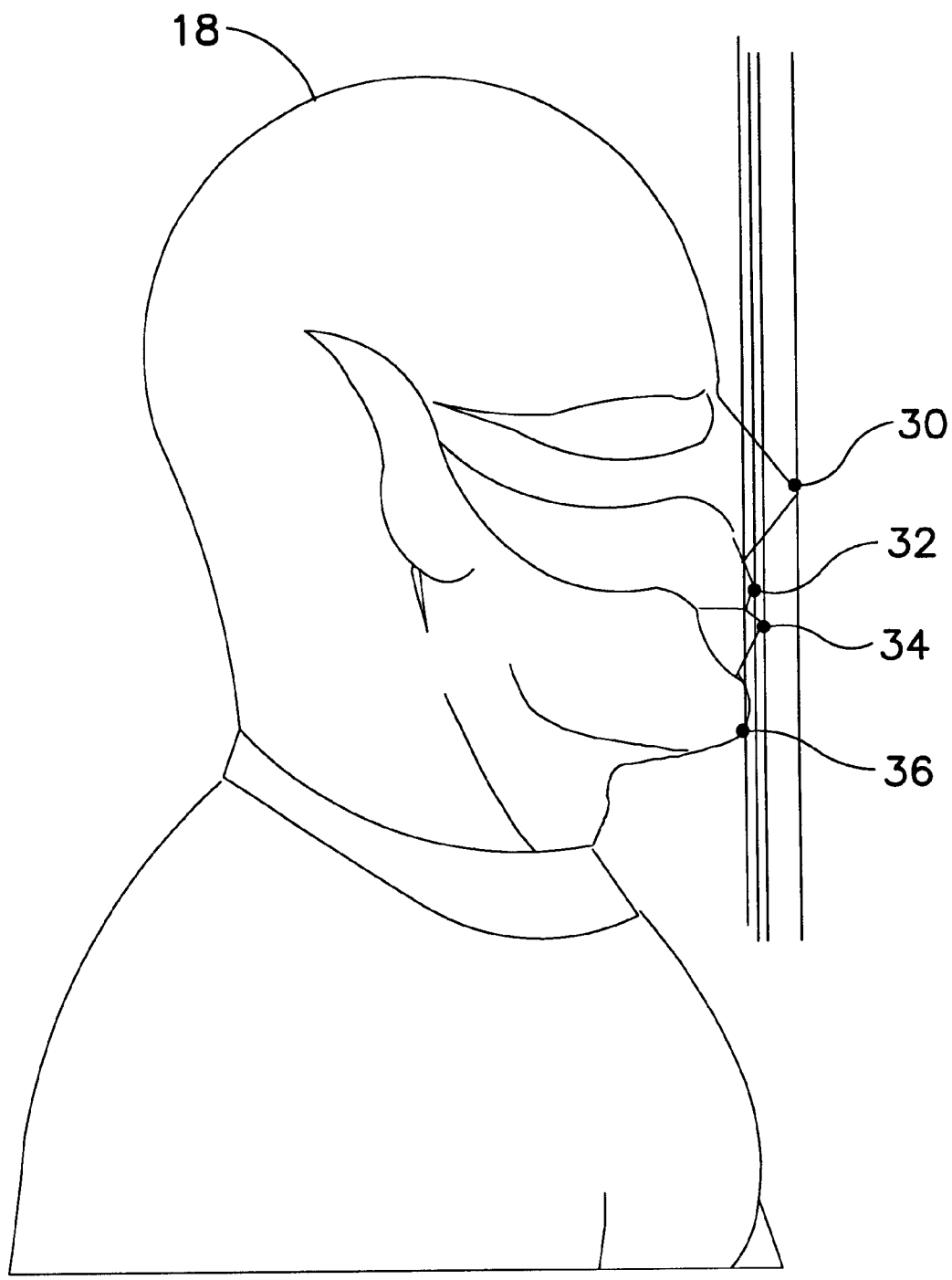
FIG. 4 is a side elevational view of an image of the character inputted into the digital computer.

With continued reference to FIG. 1 and additional reference to FIG. 2, the general process of manipulating an image will now be described in conjunction with the procedure for customizing a video game. The image of the character 16, preferably side and frontal views 18, 20, are entered into the digital computer 12 by means of appropriate input peripherals. The digital computer 12 executes a program in memory which interprets data corresponding to the character's image 16 and displays a reconstruction thereof on the attached display device. Referring additionally to FIG. 4, the side view 18 is examined and four high points 30, 32, 34, 36 are calculated by the program. The high points 30, 32, 34, 36 are defined as the most outward points on the face.

Figure 5:
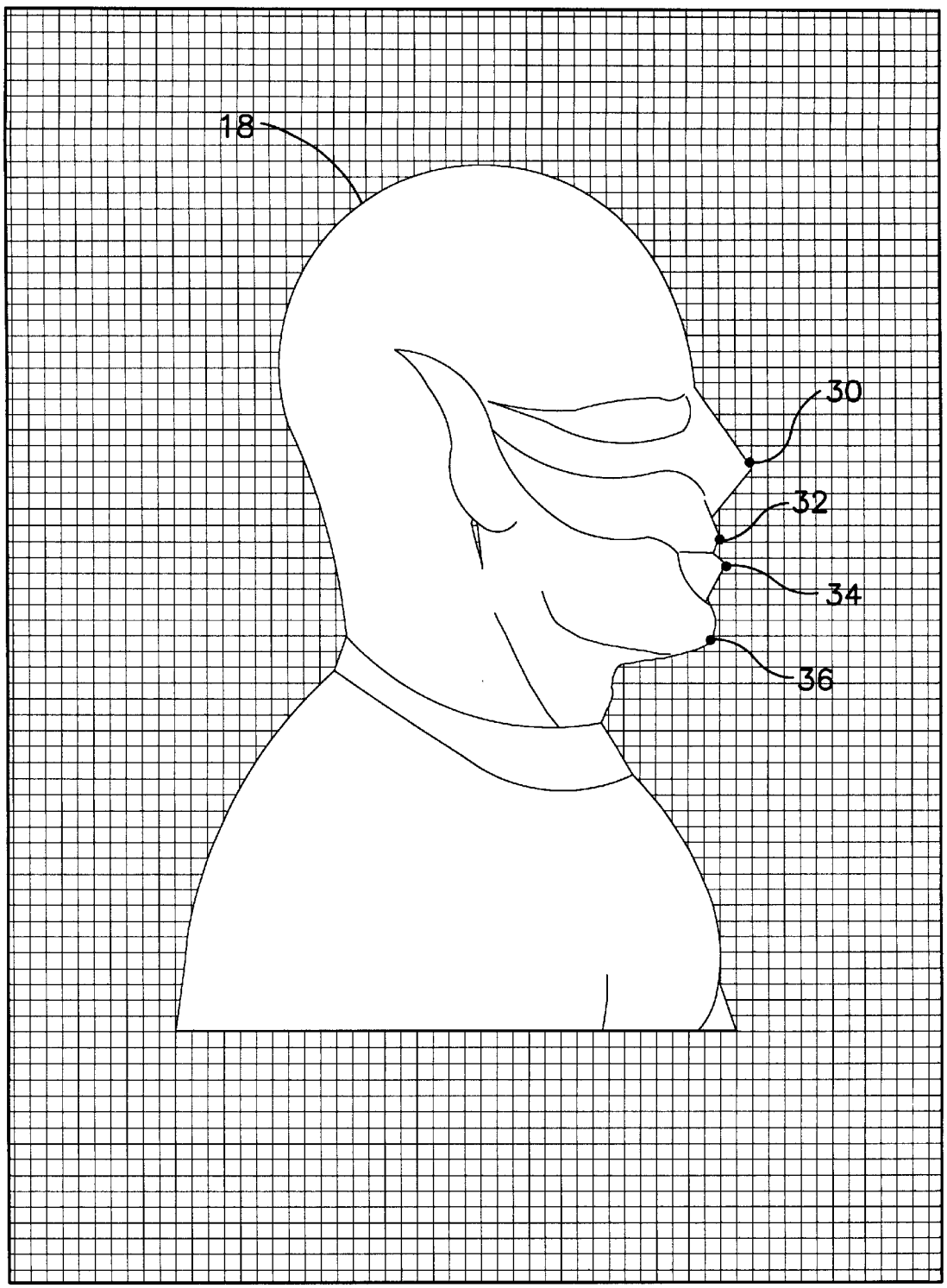
FIG. 5 is a side elevational view illustrating the alignment of a first coordinate grid with the side view of the image of the character.

A first coordinate grid is superimposed on the image constructed from the side view of the character 18. As seen in FIG. 5, the first coordinate grid is a plane which may be defined by the Y and Z axes. Next, the program moves the first coordinate grid to align it with the highest point 30 on the side view of the character 18. The highest point 30 is defined as the high point having the highest value along the Y-axis, as measured from the bottom of the image to the top. The program assumes the highest point 30 to be the tip of the nose. The next two high points 32, 34 are assumed to be the upper and lower lip, respectively. Likewise, the fourth high point 36 is assumed to be the person's chin. Each high point 30, 32, 34, 36 is identified by a corresponding grid cell. The coordinates of the high points 30, 32, 34, 36 are determined and saved.

Figure 6:
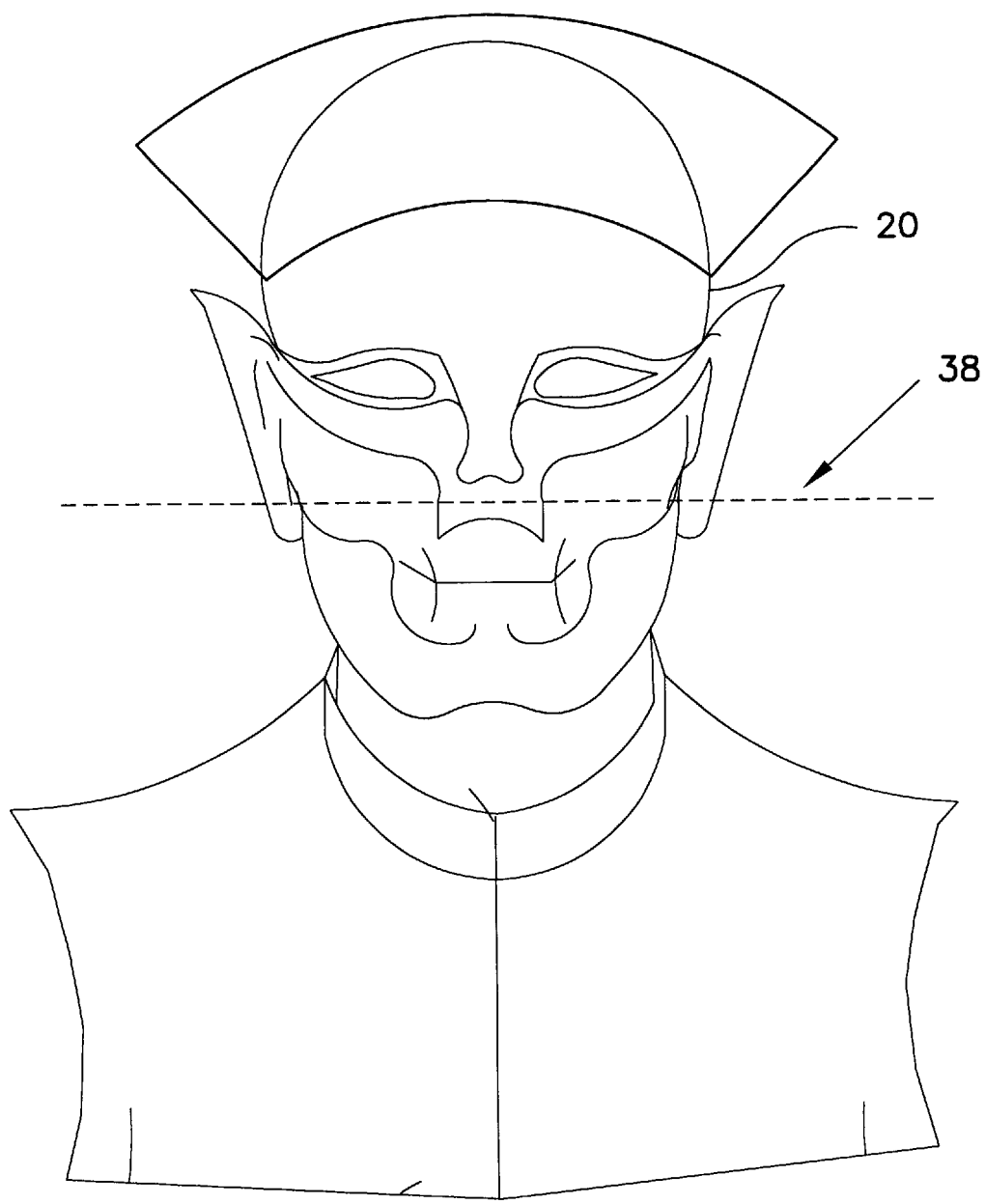
FIG. 6 is a front elevational view of the image of the character to be digitized.
Figure 7:
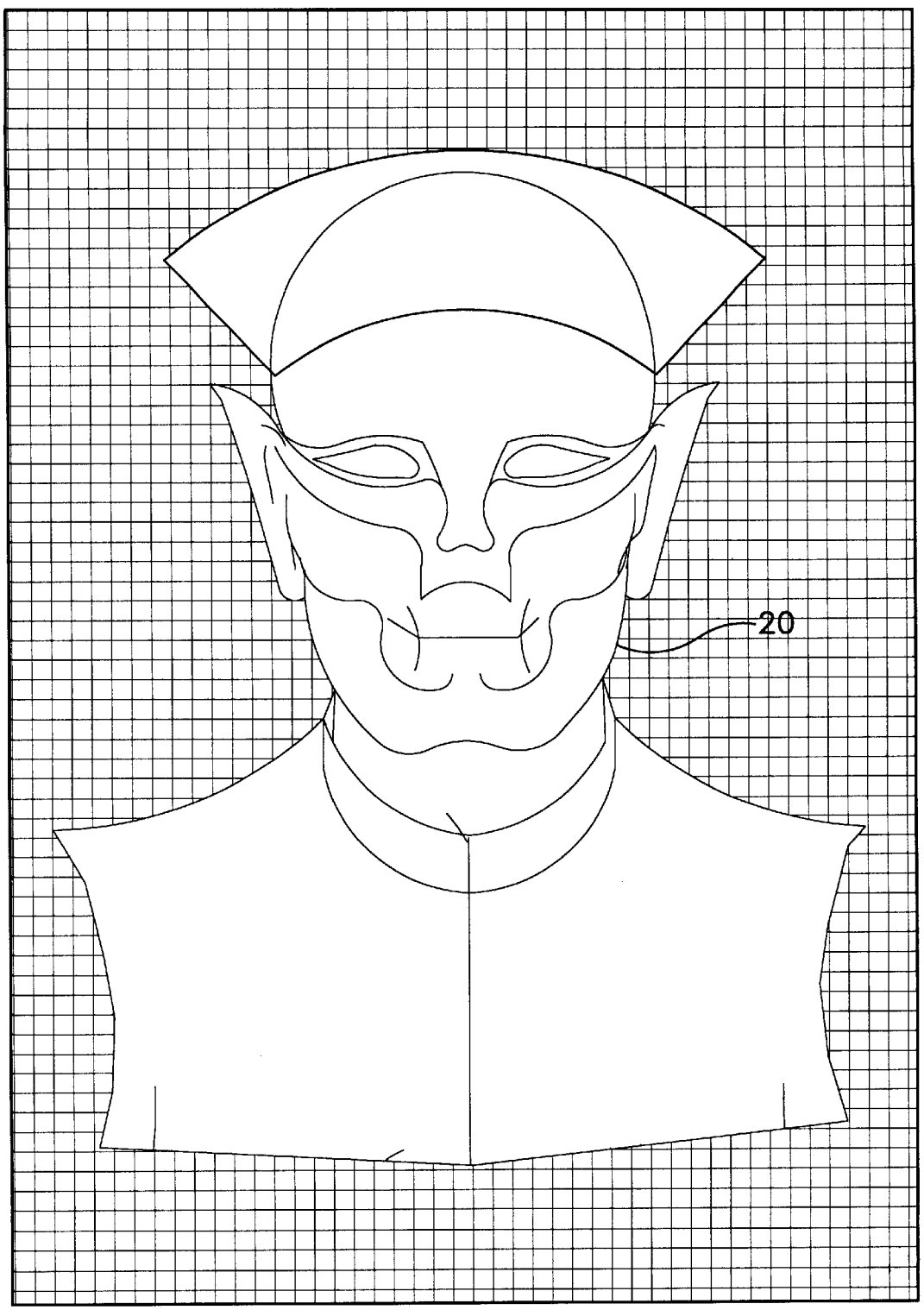
FIG. 7 is a front elevational view illustrating alignment of a second coordinate grid with the front view of the image of the character.

Turning now to FIGS. 6 and 7, a similar procedure is performed on the frontal view 20 of the character. The frontal view of the character 20 is entered into the digital computer 12. The program determines the location of the tip of the nose along the X-axis, generally indicated by the numeral 38. A second coordinate grid, which is defined by the X-Y plane, is superimposed on the frontal view of the character 20 as shown in FIG. 7. The program moves the second coordinate grid so that the origin is in alignment with the tip of the nose. Thus, the tip of the nose is aligned with the highest point 30 from the side view of the character 18.

Figure 16:
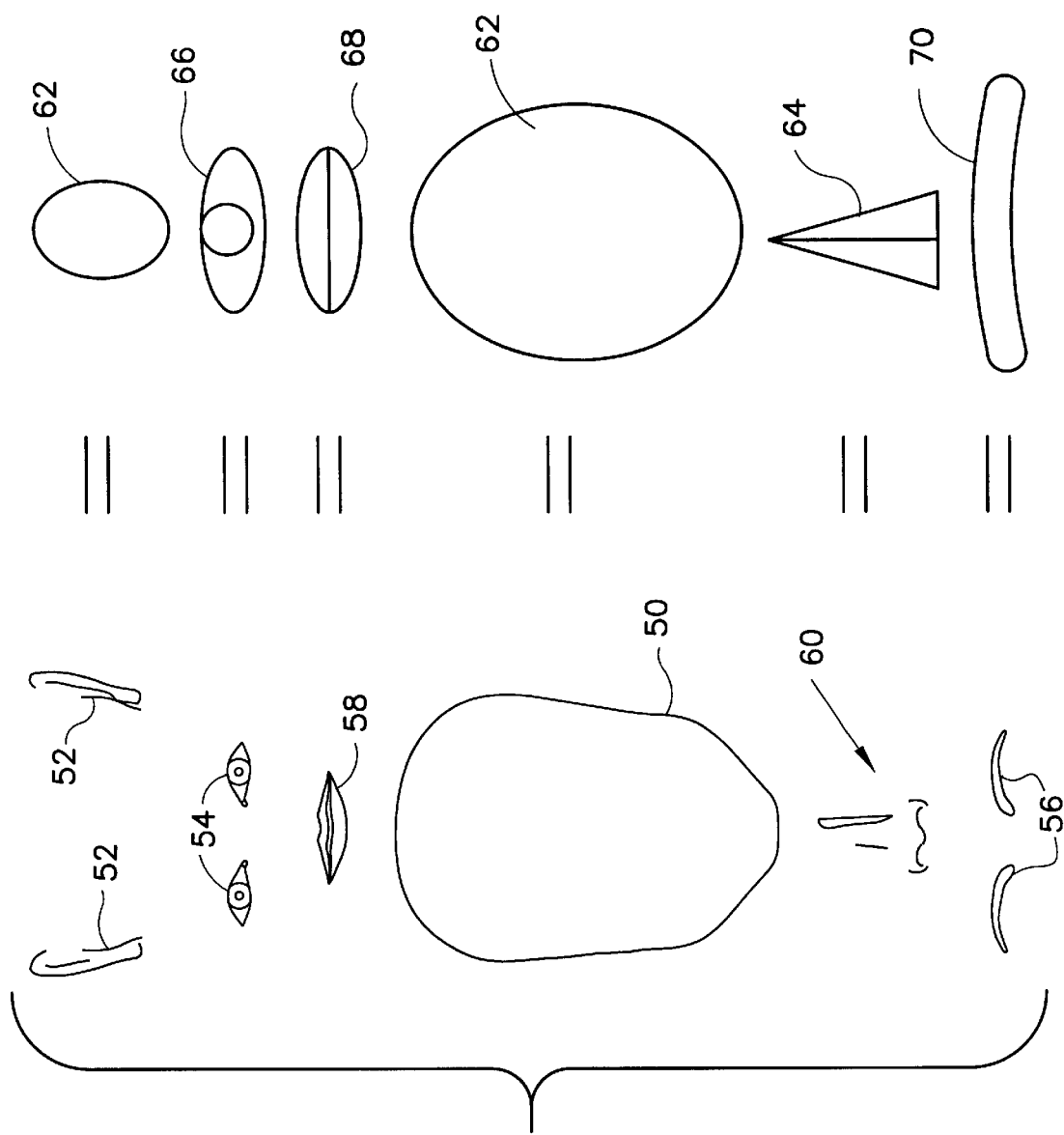
FIG. 16 illustrates the relationship between facial features and geometric shapes.

Next, the program identifies point coordinates for the character's facial features on the first and second coordinate grids using geometric shape inferences. FIG. 16 illustrates a number of facial features and their corresponding geometric shape inferences. The face 50 is generally associated with an ellipse 62 having its major diameter oriented in the vertical direction. Likewise, each ear 52 is associated with a vertically oriented ellipse 62. The eyes 54 are associated with a horizontally oriented ellipse 66 having a circle centrally disposed therein. Each eyebrow 56 is associated with an arch-shaped member 70. The mouth 58 is associated with a horizontally oriented ellipse 68 having a line segment along its major diameter. Finally, the nose 60 is associated with a triangle 64 which has vertical line perpendicular to its base and extending vertically in such a manner as to bisect the angle opposite the base. Additionally, the hair on the image may be associated with a semi-sphere; the cheeks may be associated with the combination of a sphere and an arch; the chin may be associated with a triangle superimposed on a rectangle.

Figure 8:
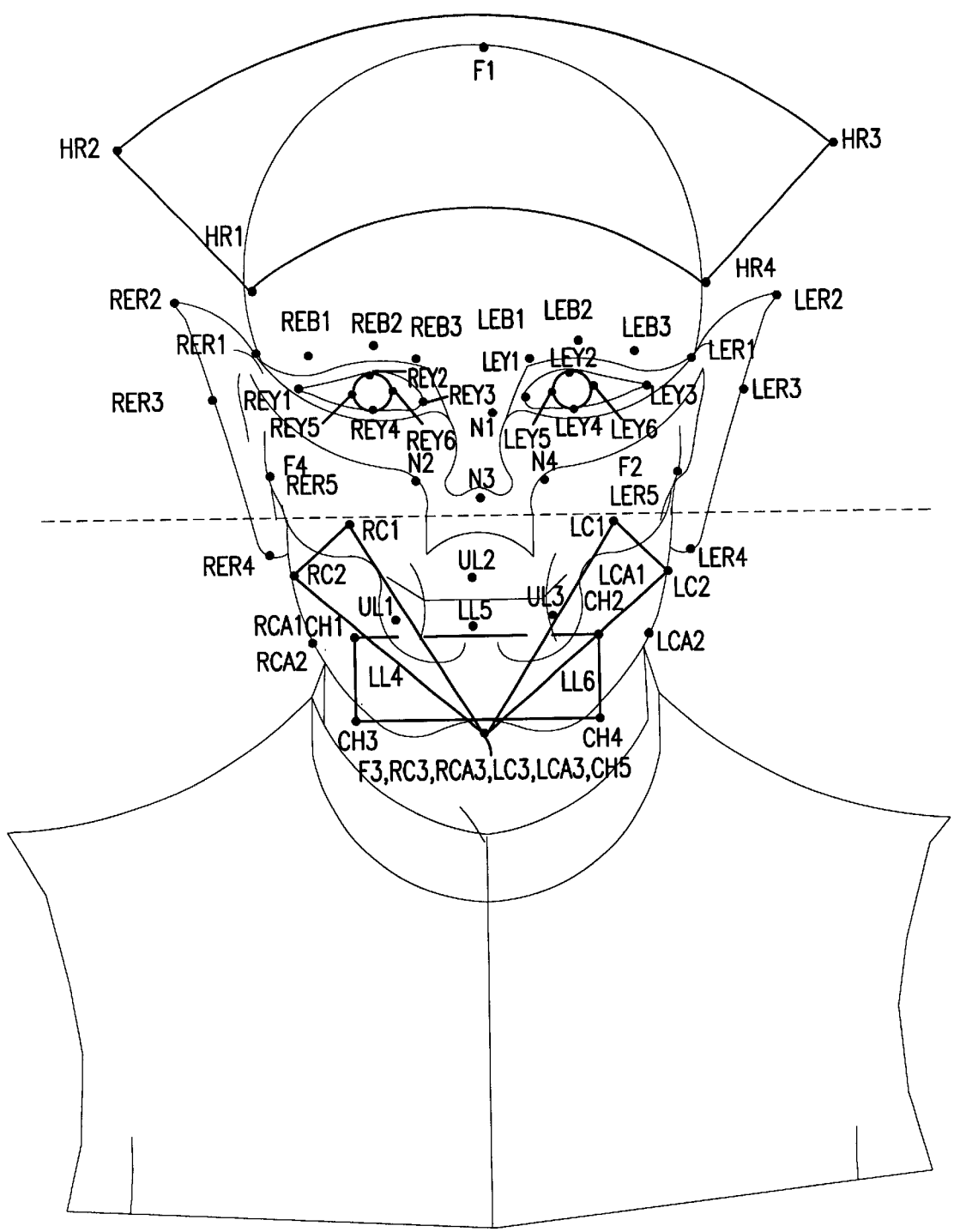
FIG. 8 is a front elevational view illustrating the landmark points of key facial features of the character.

Turning now to FIG. 8, reconstruction of the frontal view of the character's face using the geometric shapes is illustrated. The program assigns landmark points to each facial feature based on the associated geometric shape. Table 1 lists the facial features identified by the program and the nomenclature used for the landmark points associated with each feature.

TABLE 1

| FACIAL FEATURE | LANDMARK POINTS |
|---|---|
| Hair | HR1 |
|  | HR2 |
|  | HR3 |
|  | HR4 |
| Face | F1 |
|  | F2 |
|  | F3 |
|  | F4 |
| Right Eyebrow | REB1 |
|  | REB2 |
|  | REB3 |
| Left Eyebrow | LEB1 |
|  | LEB2 |
|  | LEB3 |
| Left Eye | LEY1 |
|  | LEY2 |
|  | LEY3 |
|  | LEY4 |
|  | LEY5 |
|  | LEY6 |
| Right Eye | REY1 |
|  | REY2 |

TABLE 1-continued

| FACIAL FEATURE | LANDMARK POINTS |
|---|---|
| | REY3 |
| | REY4 |
| | REY5 |
| | REY6 |
| Left Cheek | LC1 |
| | LC2 |
| | LC3 |
| | LCA1 |
| | LCA2 |
| | LCA3 |
| Right Cheek | RC1 |
| | RC2 |
| | RC3 |
| | RCA1 |
| | RCA2 |
| | RCA3 |
| Nose | N1 |
| | N2 |
| | N3 |
| | N4 |
| Left Ear | LER1 |
| | LER2 |
| | LER3 |
| | LER4 |
| | LER5 |
| Right Ear | RER1 |
| | RER2 |
| | RER3 |
| | RER4 |
| | RER5 |
| Upper Lip | UL1 |
| | UL2 |
| | UL3 |
| Lower Lip | LL4 |
| | LL5 |
| | LL6 |
| Chin | CH1 |
| | CH2 |
| | CH3 |
| | CH4 |
| | CH5 |

Figure 9:
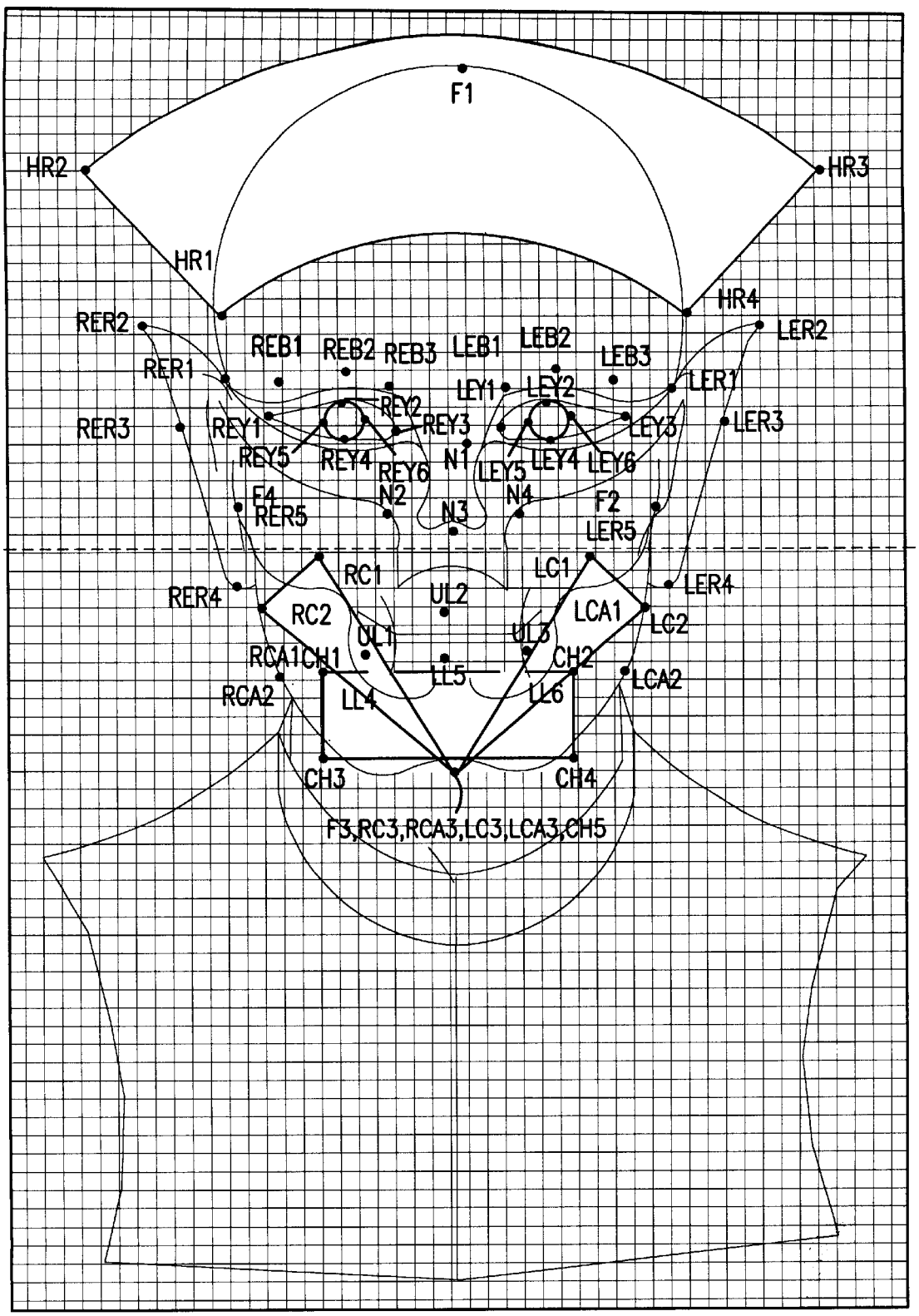
FIG. 9 is a front elevational illustrating the determination of coordinates for landmark points on the character.

Turning to FIG. 9, the second coordinate grid is superimposed on the frontal view of the character and aligned such that the origin is positioned at the tip of the nose, i.e., the highest point 30. Once the second coordinate grid is properly aligned, the coordinates of each landmark point are calculated. The program includes various parameters and assumptions designed for use in assigning values to the coordinates points when the precise location of such points is unclear.

The program handles each facial feature as an object to maximize data abstraction and allow transparent replacement of identical objects from different images. Additionally, the program may include a database of various types and sizes of objects which may be used on an image. For example, the database may contain a collection of noses, mouth types, and hair styles that may be pasted on an image. As those skilled in the art will appreciate, accuracy and realism may be increased by using smaller mesh sizes or increasing the number of reference points used in the objects.

Figure 10:
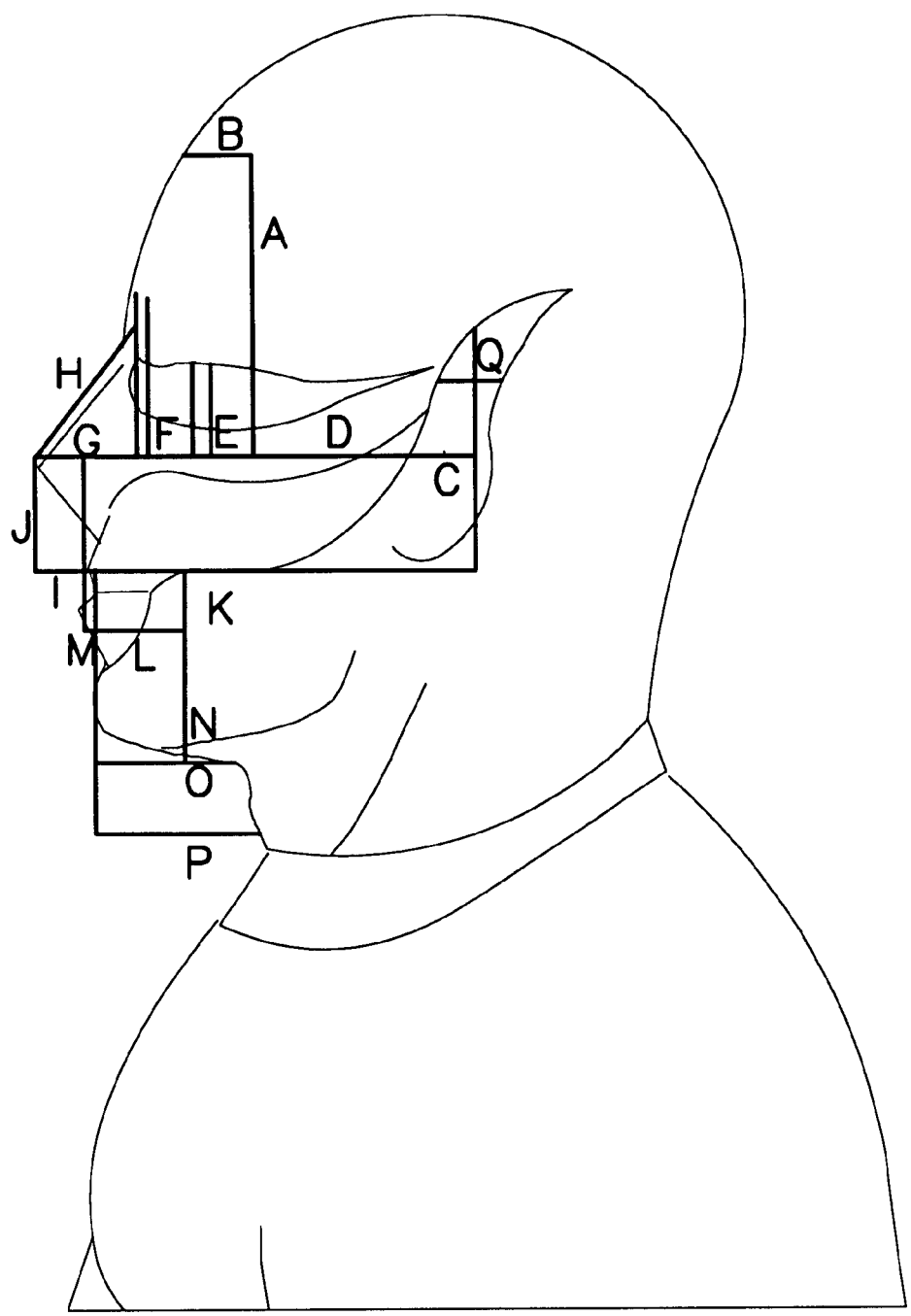
FIG. 10 is a side elevational view illustrating the determination of the natural layout of the character's facial features.
Figure 11:
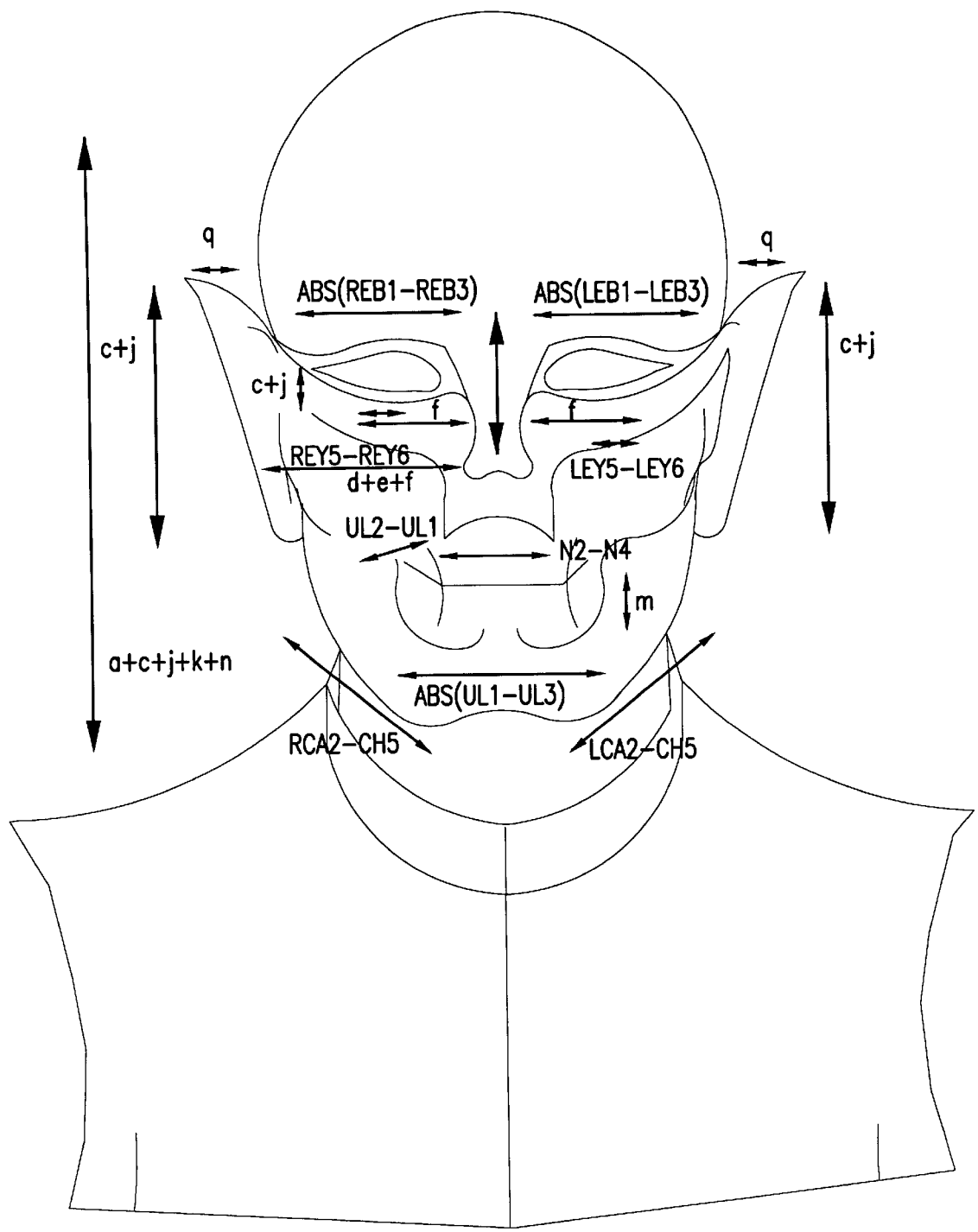
FIG. 11 is a front elevational view illustrating the mathematical determination of dimensions of the character's facial features.

Next, the software applies several mathematical equations and formulas to the side view 18 and the frontal view 20 of the character 18, as seen in FIGS. 10 and 11. The mathematical equations are designed to calculate the natural layout of landmark points on the image of the character. The program makes the assumption that every face is symmetrical. Thus, the coordinates determined can be mirrored for use on the opposite side of the face. The mathematical equations are also applied to the image captured from the frontal view of the character 20. The program allows the user to customize the first and second coordinate grids so that real world dimensions may be applied to the points if necessary. Thus, the distance between landmark points calculated by taking the absolute value of the difference between landmark points.

Consider a coordinate grid wherein each cell is dimensioned as a 1 mm×1 mm square. Next, consider two landmark points which are spaced four grid cells apart. The two landmark points have the same X-coordinate and different Y-coordinates. The distance between the two landmark points is thus 4 units. If the grid cell dimensions are applied, then the distance becomes 4 millimeters. Tables 2 and 3 list the variables and mathematical equations used in determining the layout of the character's face in correspondence with FIG. 9 and FIG. 10, respectively.

TABLE 2

| VAR | DEFINITION |
|---|---|
| b + ? | Circumference between middle of forehead to farthest point of eyelid. "?" is arbitrarily assigned by user |
| a | height from top of forehead to farthest point of eyelid |
| d + e + f | distance from nose bridge N1 to tip of ear RER2 |
| h | length of nose from bridge tip N1 to nose tip N3 based on equation: $h^2 = g^2 + c^2$ |
| j | height from nose tip N3 to upper lip UL2 along Y-axis |
| k | height from upper lip UL2 to lower lip LL5 along Y-axis |
| l | depth from nose tip N3 to upper lip UL2 along Z-axis |
| m | dist. from upper lip UL2 to lower lip LL5 along Z-axis. |
| L | length of lower lip from LL5 to LL4 and LL5 to LL6 |
| m + L | length of upper lip from UL2 to UL1 and UL2 to UL3 |
| n | height between lower lip tip LL5 and chin bottom CH5 |
| p | distance from chin tip CH5 to back of right cheek RCA2 |
| q | width of ears from RER1 to RER3 and LER1 to LER3 |

TABLE 3

| Equation | Definition |
|---|---|
| abs(REB1 − REB3) | right eyebrow length |
| abs(LEB1 − LEB3) | left eyebrow length |
| abs(c + j) | height of each eye from upper lip |
| abs(REY5 − REY6) | width of right pupil |
| abs(LEY5 − LEY6) | width of left pupil |
| q = abs(RER1 − RER3) | width of right ear |
| q = abs(LER1 − LER3) | width of left ear |
| abs(N1 − N3) | length of nose from bridge to tip |
| abs(N2 − N4) | width of nose from right to left nostril |
| abs(UL1 − UL3) | length of each lip from corner to corner |
| abs(UL1 − UL2) | length of each lip from corner to mid |
| abs(RCA2 − CH5) | length of right cheek |
| abs(LCA2 − CH5) | length of left cheek |
| abs(d + e + f) | dist. bet. symmetric plane and mid-ear |
| abs(a + c + j + k + n) | height of body of face |

The layout of the character's face may also be modified by adjusting the position of key landmark points, thus changing the expression thereon. For example, if a frown is desired, the landmark points representing the lips would be positioned in the shape of an inverted arch. Alternatively, if a smile were desired, then the landmark points representing the lips would be positioned in the shape of a "U".

Figure 12:
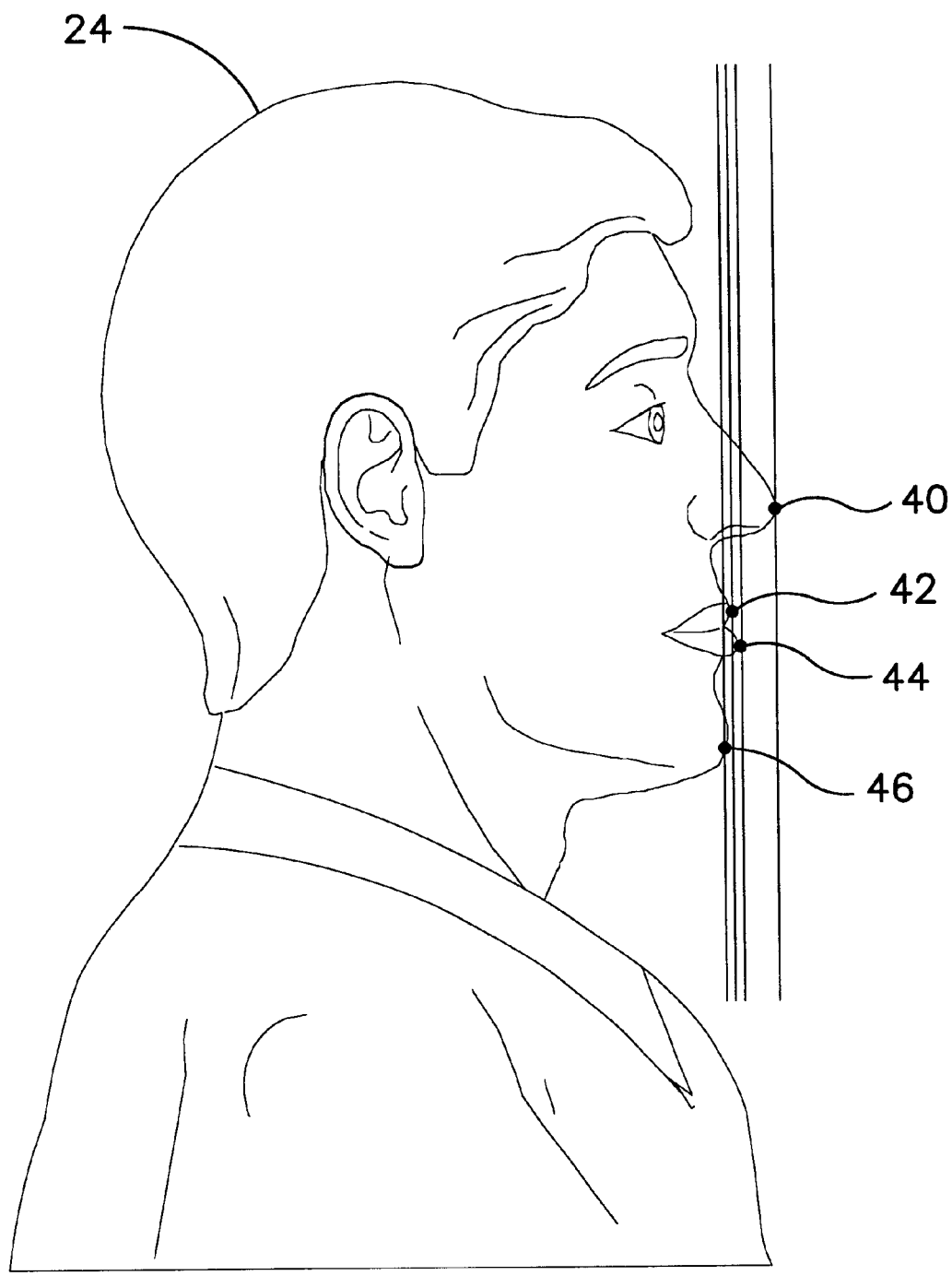
FIG. 12 is a side elevational view of an image of a player to be inputted into the digital computer.
Figure 13:
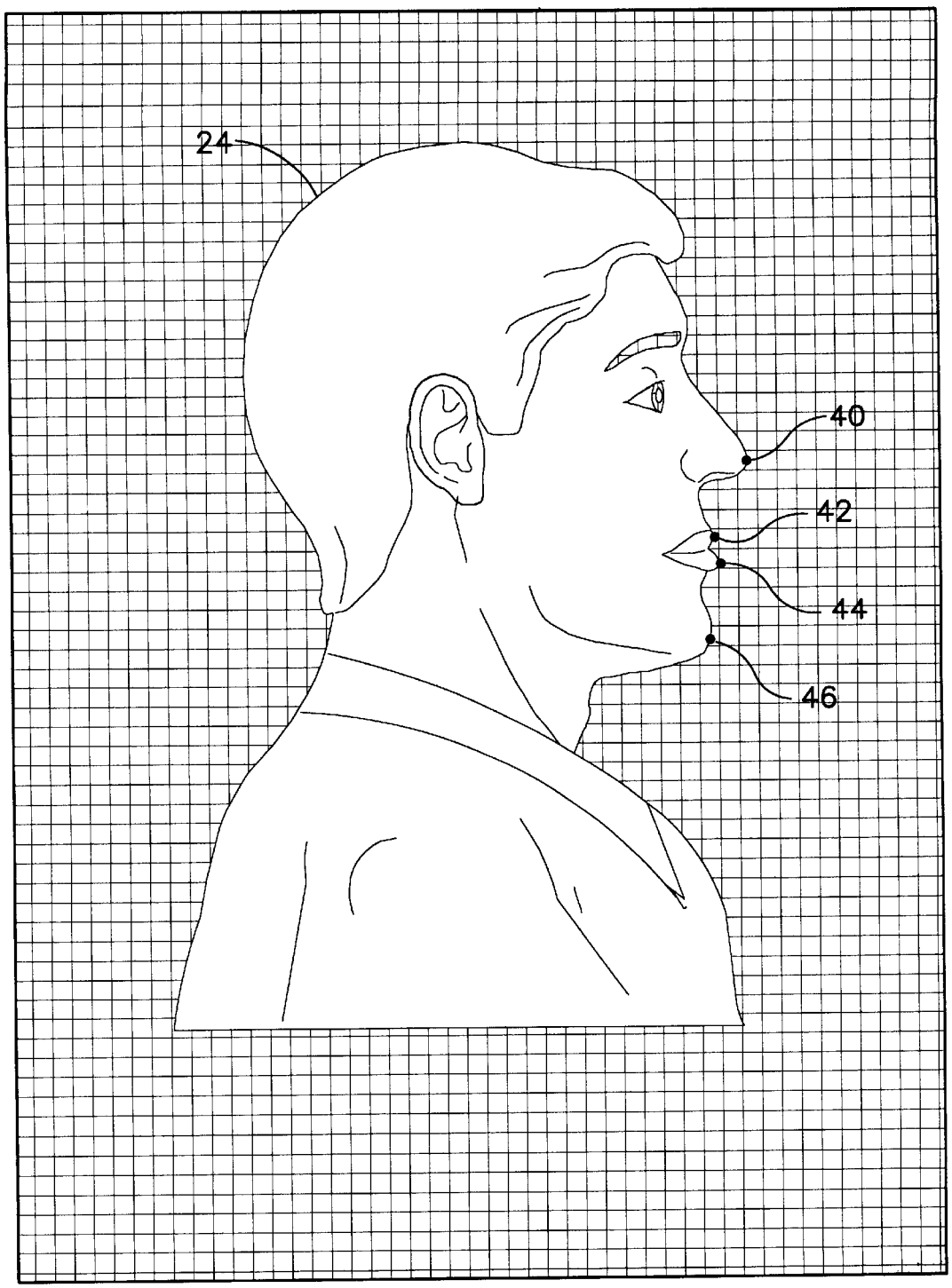
FIG. 13 is a side elevational view illustrating the alignment of a first coordinate grid with the side view of the player.

Once the character's image 16 has been entered into the digital computer 12 and properly manipulated, the image of the player 22 is entered in a similar manner. The image of the player 22, preferably side and frontal views 24, 26, are entered into the digital computer 12 via appropriate input peripherals. The digital computer 12 interprets data corresponding to the player's image 22 and displays a reconstruction thereof on the attached display device. Referring to FIG. 12, the side view of the player 24 is examined and four high points 40, 42, 44, 46, defined as the most outward points on the face, are calculated by the program. A first coordinate grid is superimposed on the side view of the player 24. As seen in FIG. 13, the first coordinate grid is a plane which may be defined by the Y and Z axes. Next, the program moves the first coordinate grid to align it with the highest point 40 on the side view of the player, i.e. the point having the highest value along the Y-axis, as measured from the bottom of the image to the top. The program assumes the highest point 40 to be the tip of the nose. The next two high points 42, 44 are assumed to be the upper and lower lip, respectively. Finally, the fourth high point 46 is assumed to be the chin. Each high point 40, 42, 44, 46 is identified by a corresponding grid cell. The coordinates of the high points 40, 42, 44, 46 are determined and saved.

Figure 14:
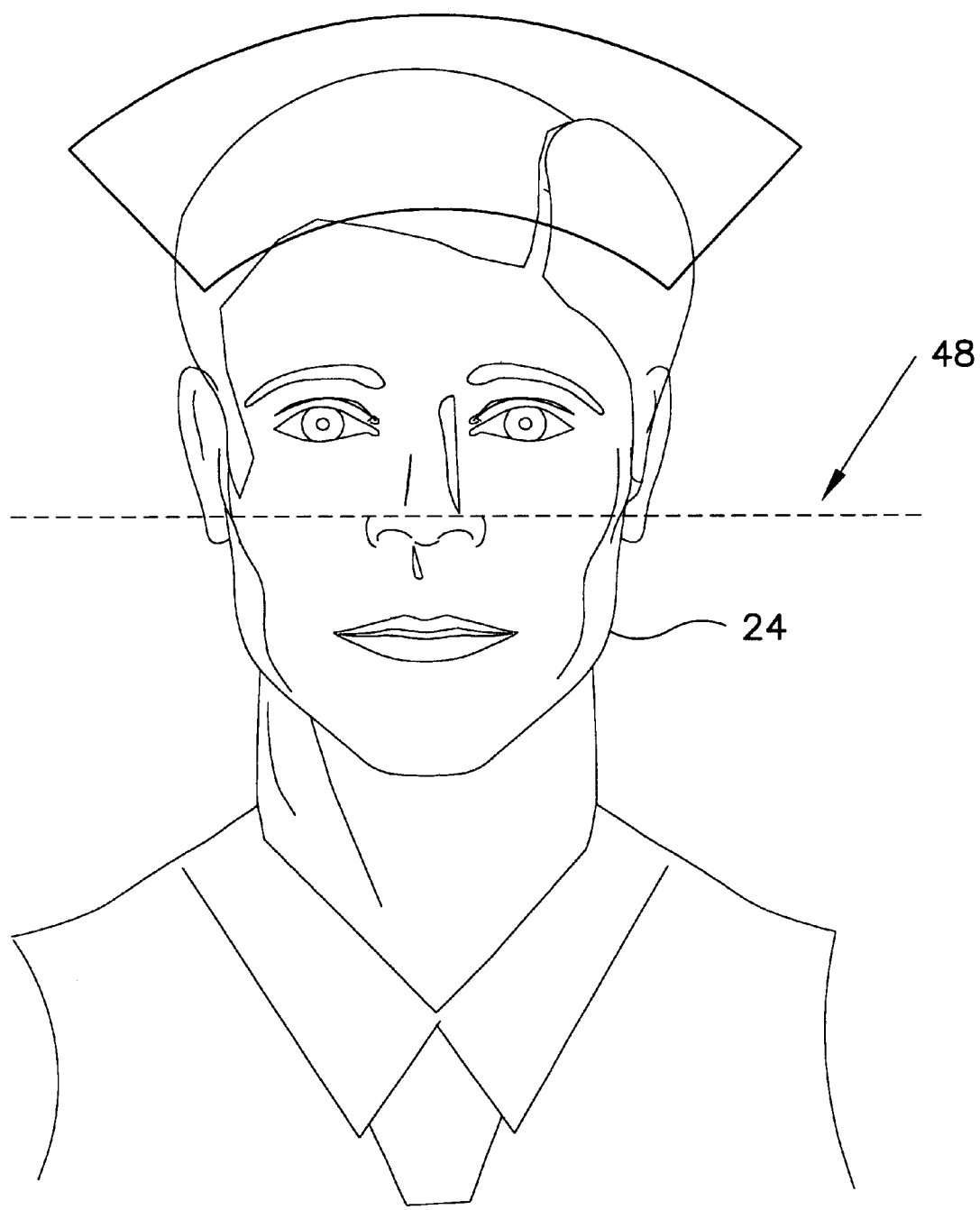
FIG. 14 is a front elevational view of the image of the player to be inputted into the digital computer.
Figure 15:
FIG. 15 is a front elevational view illustrating alignment of a second coordinate grid with the front view of the player.

Turning now to FIGS. 14 and 15, the frontal view of the player 26 is entered into the digital computer 12. The program determines the location of the tip of the nose along the X-axis, generally indicated by the numeral 48. A second coordinate grid, defined by the X-Y plane, is superimposed on the frontal view of the player 26. The program aligns the second coordinate grid so that the origin is in alignment with the tip of the nose, and the tip of the nose is aligned with the highest point 40 from the side view of the player 24.

Next, the program identifies point coordinates for the player's facial features on the first and second coordinate grids using geometric shape inferences. FIG. 16 illustrates some facial features and their corresponding geometric shape inferences.

Figure 17:
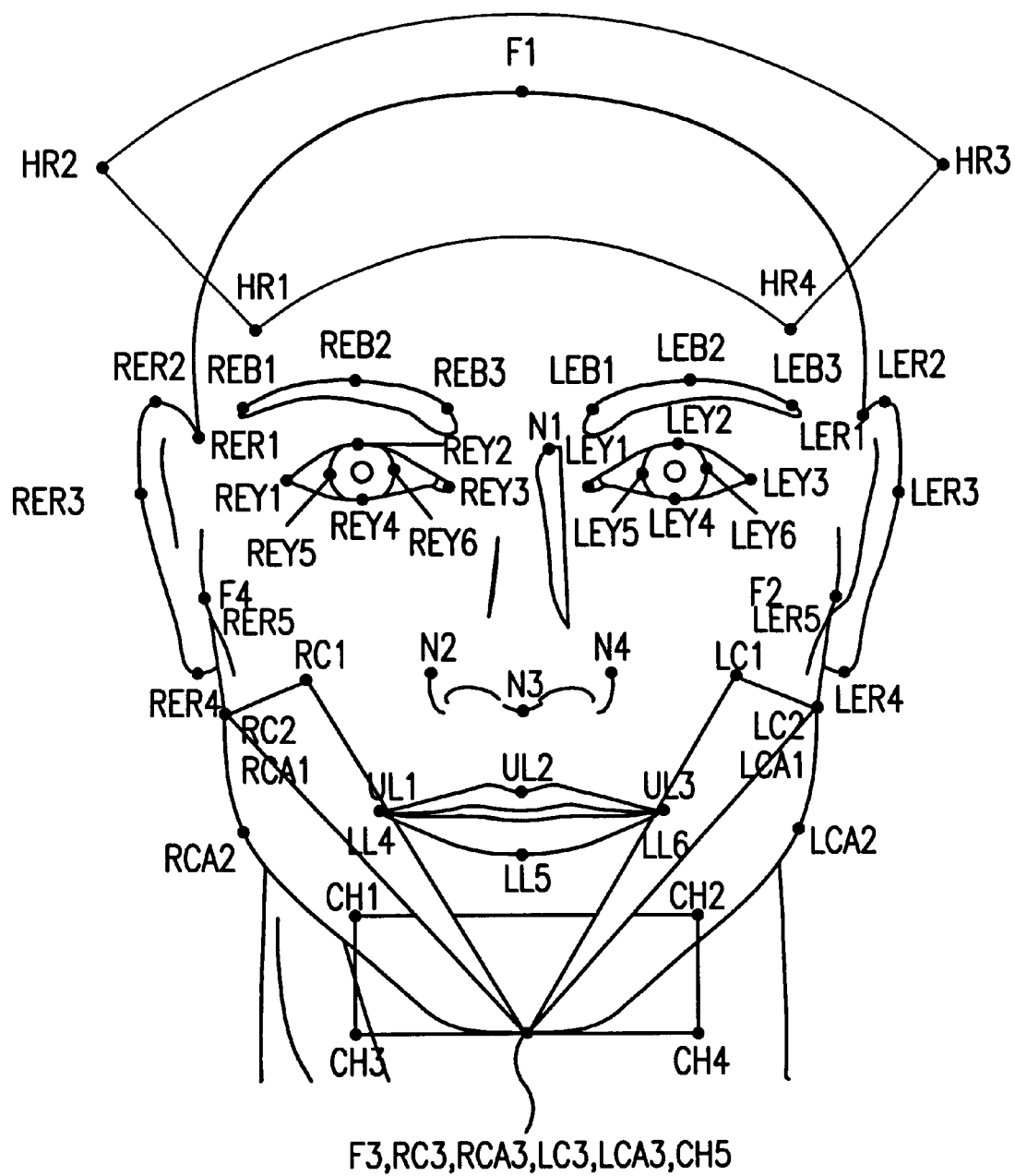
FIG. 17 is a front elevational view illustrating the landmark points of key facial features of the player.
Figure 18:
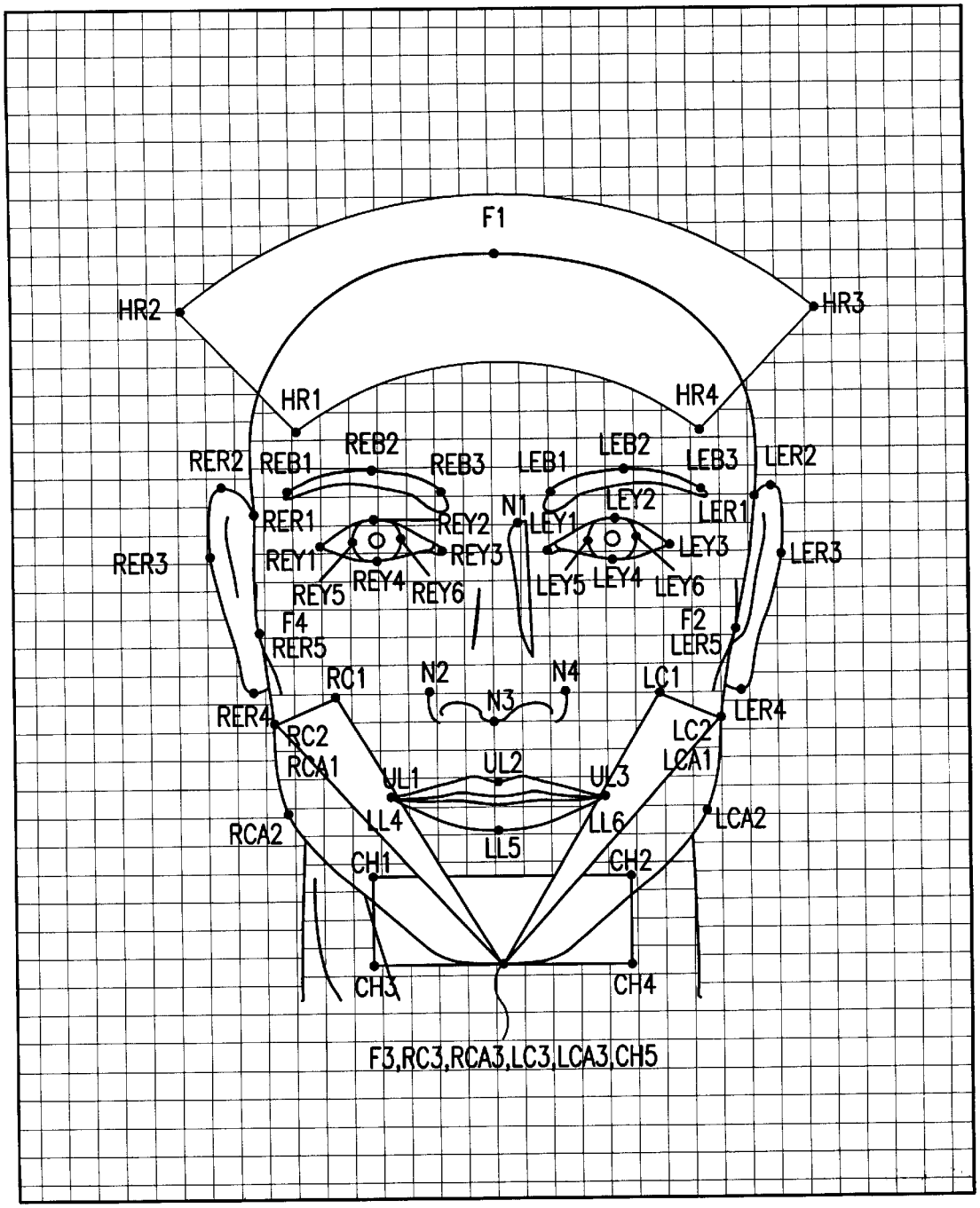
FIG. 18 is a front elevational illustrating the determination of coordinates for landmark points of the player.

FIGS. 17 and 18 illustrates reconstruction of the frontal view of the player's face using the geometric shapes. Landmark points are assigned to each facial feature based on the associated geometric shape. (See Table 1 for list of facial features identified by the program and the nomenclature used for the landmark points associated with each feature). The second coordinate grid is superimposed on the frontal view of the player and aligned such that the origin is positioned at the tip of the nose, i.e., the highest point 40. Once the second coordinate grid is properly aligned, the coordinates of each landmark point are calculated.

Figure 19:
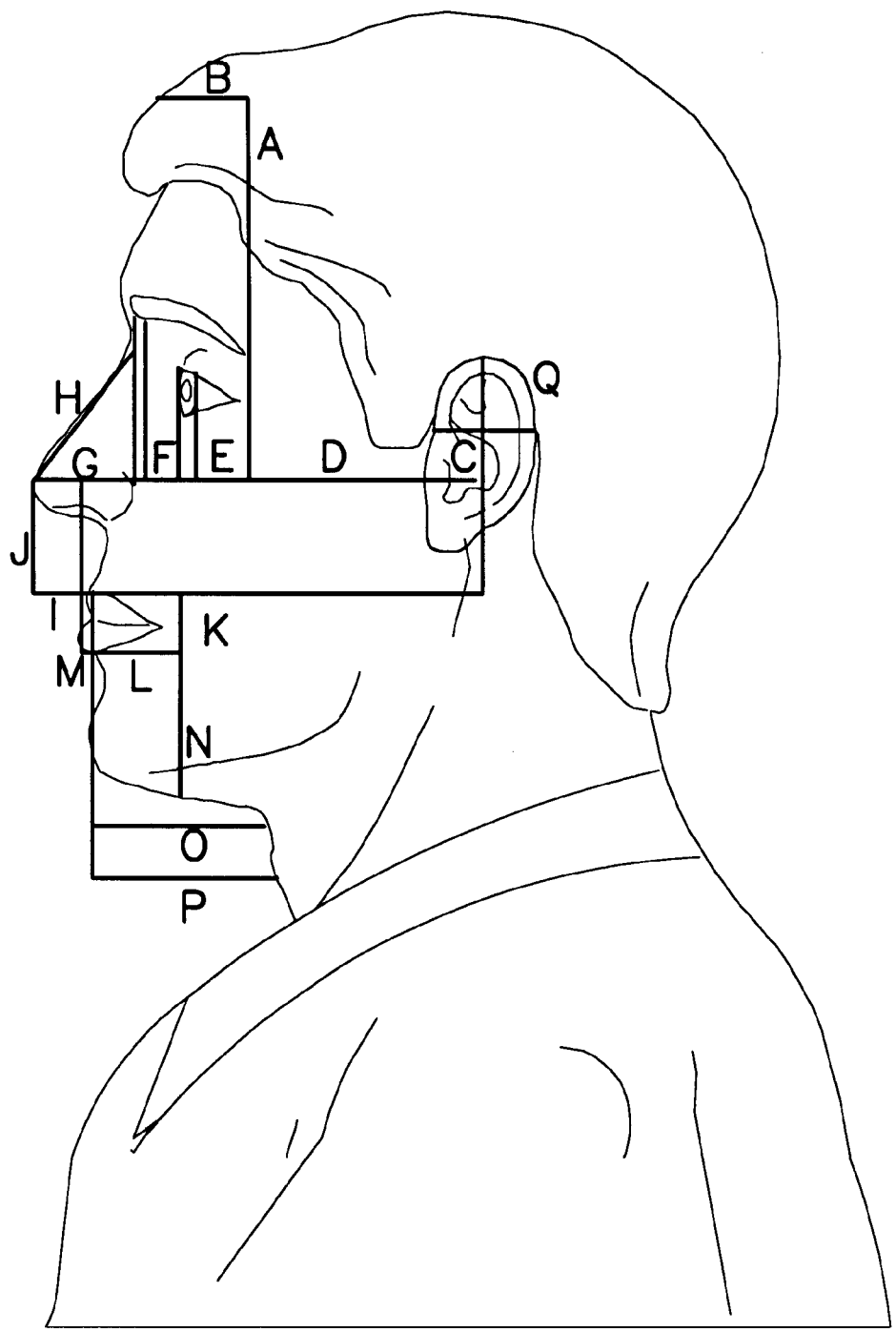
FIG. 19 is a side elevational view illustrating the determination of the natural layout of the player's facial features.
Figure 20:
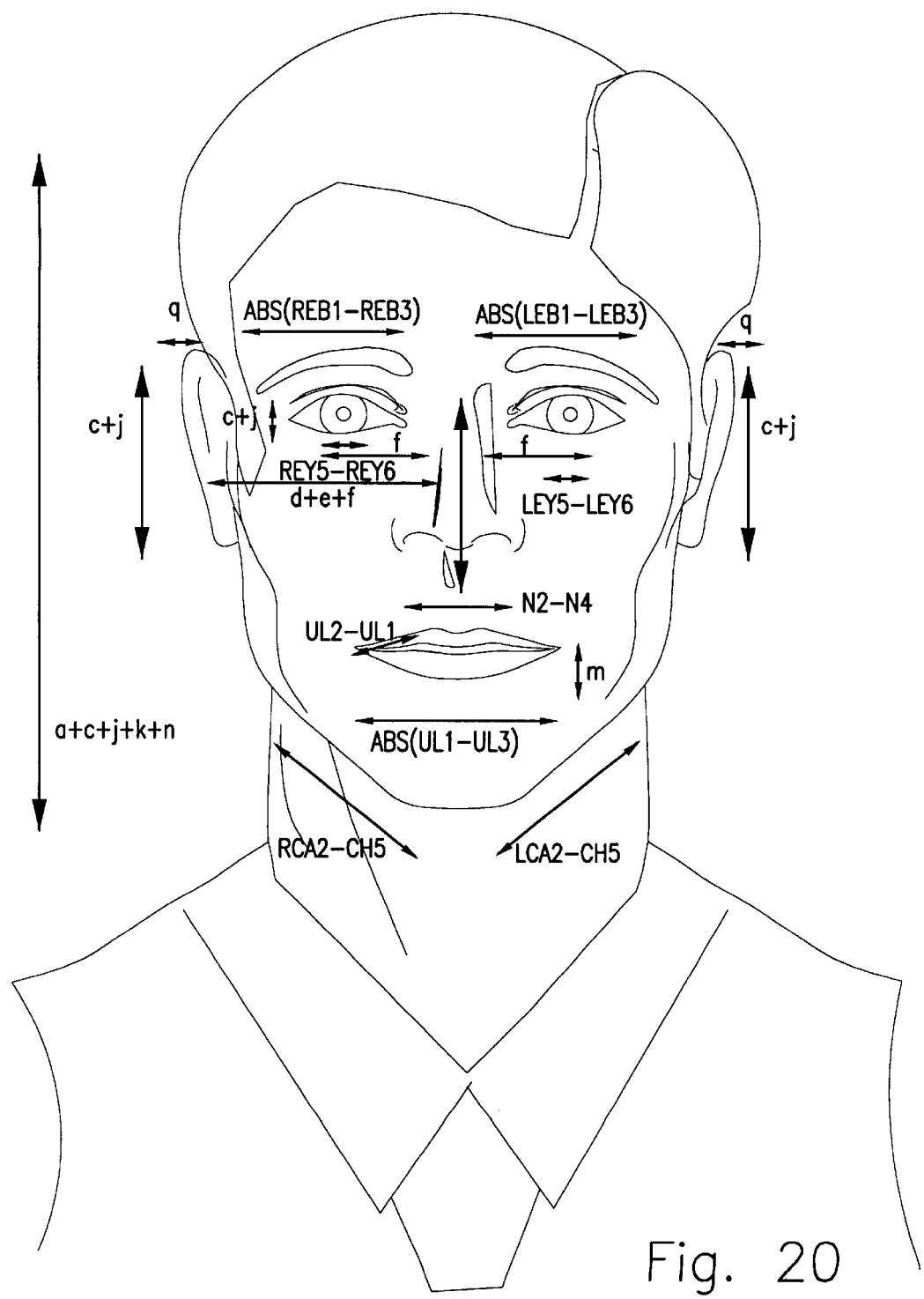
FIG. 20 is a front elevational view illustrating the mathematical determination of dimensions of the player's facial features.

Next, the program applies mathematical equations and formulas to the side view 24 and the frontal view 26 of the player, as seen in FIGS. 19 and 20. The mathematical equations are designed to calculate the natural layout of landmark points on the image of the player. The mathematical equations are also applied to the frontal view of the player 20. The program allows the user to customize the first and second coordinate grids so that real world dimensions may be applied to the points if necessary. (see Tables 2 and 3 for list of variables and mathematical equations used in correspondence with FIG. 19 and FIG. 20, respectively.)

At this point, the facial features of the character are replaced with the corresponding facial features of the player. The program examines the position of landmark points on the character and attempts to duplicate their relative positions on the player. Thus, any expressions identified on the character's face will be reproduced when it is replaced by the image of the player. The resulting images are saved as frames accessible by the video game machine 14. Now when the game is played, the image of the character is replaced with the image which the player entered into the digital computer 12.

Figure 3:
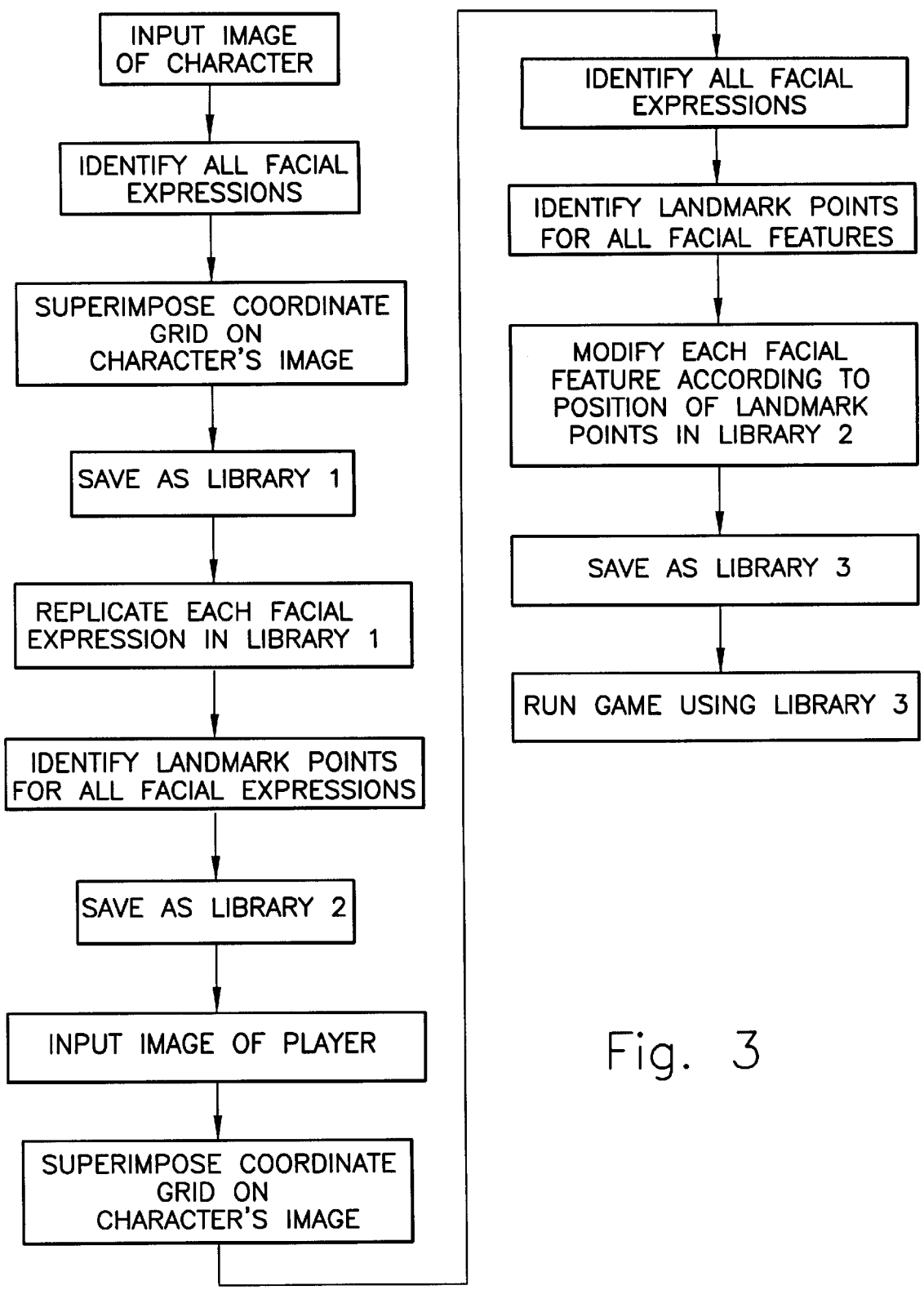
FIG. 3 is a flowchart illustrating the steps of an alternative embodiment for customizing video games.

Turning now to FIG. 3, an alternative method is illustrated for customizing video games. The image of a character 16 from the video game is input into the digital computer 12. The digital computer 12 reproduces the image of the character 16 on the viewing device and a coordinate grid is superimposed thereon. Additional images of the character which contain different facial expressions are entered into the digital computer 12. As used herein, facial expressions correspond to the exact positioning of the character's facial features that are used to produce an expression on the character's face, such as a smile, frown, etc. Point coordinates corresponding to facial expressions of the character are identified using geometric shape inferences. The various facial expressions are saved as a first library file. Each facial expression in the first library file is replicated and landmark points are identified. A second library file is created which contains the exact position of the landmark points of all facial features for each facial expression.

An image of the player is entered into the digital computer 12 and reproduced on the viewing device. Next a coordinate grid is superimposed on the image of the player. The landmark points of the player's facial features are identified. The program now modifies each facial feature of the player by assigning the coordinates from corresponding landmark points in the second library file. A third library file is created which contains images of the player with the facial expressions of the character. The third library file is saved in a format which is accessible by the video game machine. Now when the game is played, the image of the character is replaced with that of the player, and all expressions made by the character in the regular game is properly replicated.

In preferred embodiments of the invention, the player may be provided with the option to use his image in the game. Furthermore, a plurality of images corresponding to different family members may also be used. Thus, in games which allow more than one player, various individuals may play with or against each other. Furthermore, images of pets or other animals may be entered into the digital computer.

Figure 21:
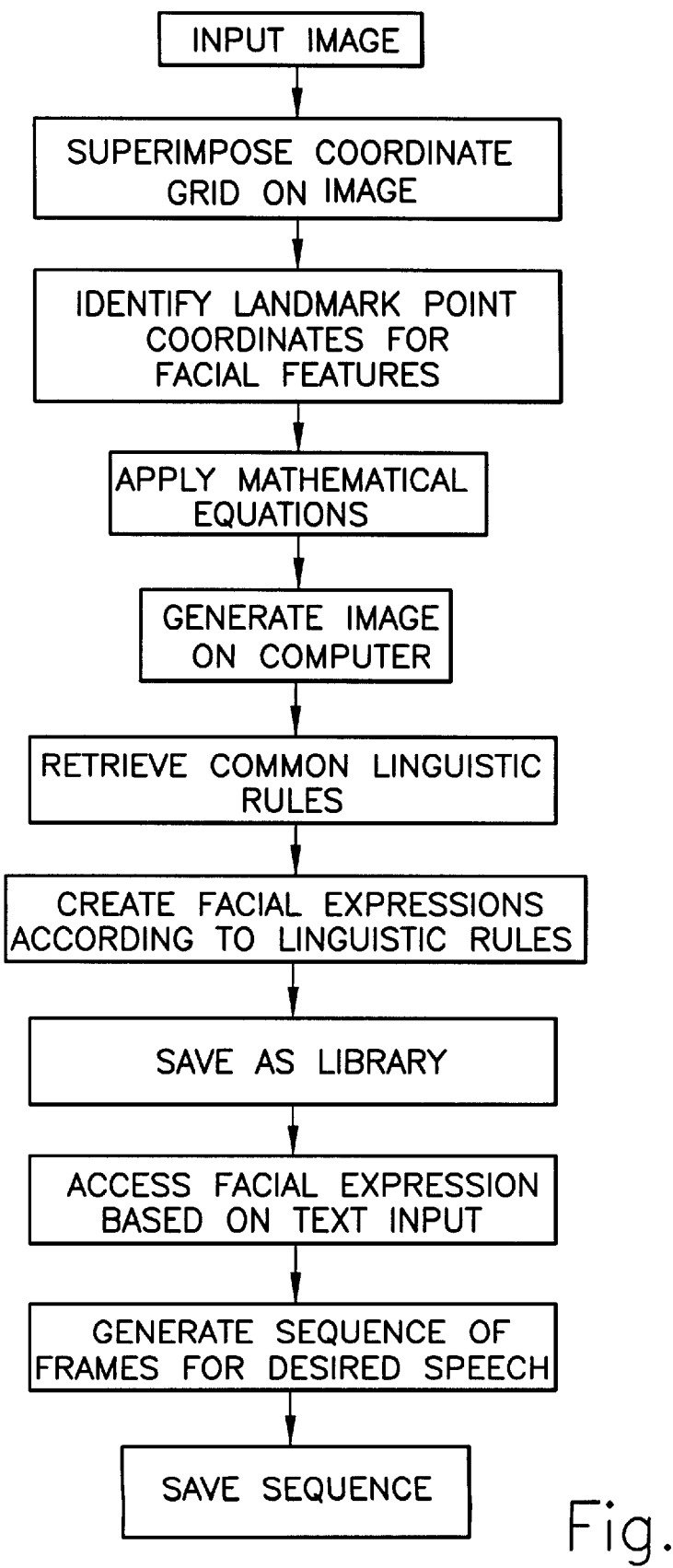
FIG. 21 is a flowchart illustrating the steps for performing animation in accordance with the present invention.

FIG. 21 illustrates a method for performing animation. As described in great detail hereinbefore, an image is entered into the digital computer 12. The image should correspond to a view of a person or thing which will be primarily shown during the animation sequence. Multiple views of the image may be entered, and the program will generate a three-dimensional representation on the display image. The image is displayed on a viewing device and a coordinate grid is superimposed thereon. Point coordinates corresponding to facial features are identified using geometric shape inferences. Mathematical equations and formulas are applied to the geometric shape inferences in order to determine the natural layout of the facial features. Once the natural layout of the face is determined, the mathematical equations may be further applied to manipulate the geometric shape inferences to simulate facial expressions.

The program accesses an associated database containing common linguistic rules. The database may be provided as part of the program or it may be accessible as an independent file. The linguistic rules identify specific movements of the face when particular words, sounds, or letter combinations are spoken. The linguistic rules are used to modify facial expressions for enunciation and pronunciation of various words and phrases. For example, when speaking the letter "O", the lips are commonly placed in an open and slightly puckered position. Such a speech pattern is interpreted by increasing the absolute value of the space between landmark points UL2 and LL5, and decreasing the absolute value of the distance between landmark points LL4 and LL6.

A plurality of facial expressions are created based on the different linguistic rules for all letters, numbers, words, and phrases. As the facial expressions are created, they are saved within a library file. A sequence of frames is subsequently generated by sequentially retrieving different frames based on text supplied in order to simulate speech by the image. Since the facial expressions of the image are modified according to the linguistic rules, an animation of the image is generated which simulates motion of facial features just as in real life. The animated speech sequences can also be saved so that they may be played automatically in response to predetermined inputs.

Figure 22:
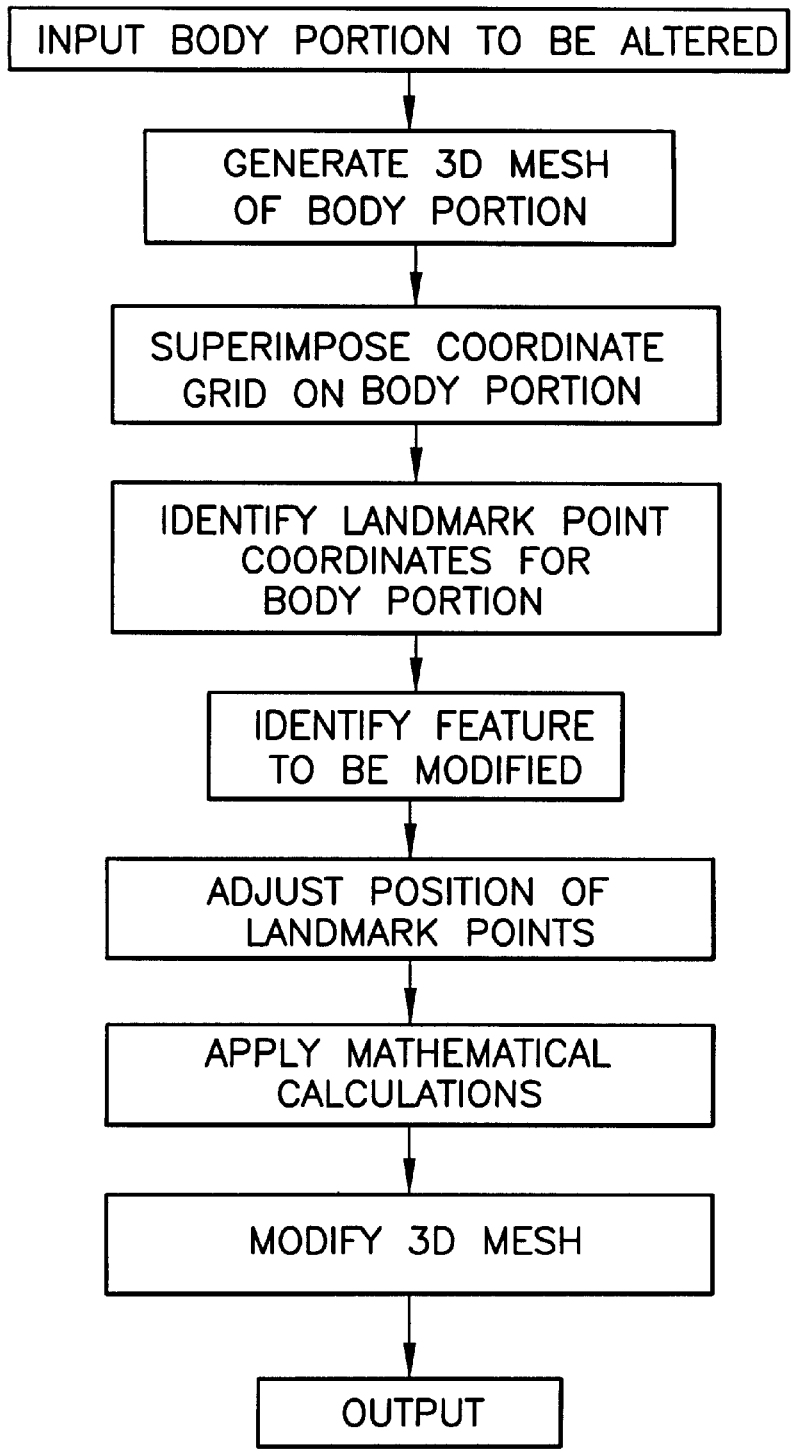
FIG. 22 is a flowchart illustrating the steps for simulating cosmetic reconstruction in accordance with the present invention.

Turning now to FIG. 22, a method for simulating cosmetic reconstruction is illustrated. The image of a desired body portion is entered into the digital computer. The body portion can correspond the legs, face, etc. Depending on the specific body portion upon which the simulation will be performed, a three-dimensional field of view may be generated by the program. In general most body portions which contain curvature or elevation will require a three-dimensional representation. The image is displayed on the viewing device and a coordinate grid is superimposed thereon. Point coordinates corresponding to key features are identified using geometric shape inferences. Key features correspond to specific areas on the body portion which may be altered or moved. For example, if cosmetic reconstruction of a nose is to be performed, the nostrils or the bridge of the nose may be identified as key features.

Mathematical equations and formulas are applied to the geometric shape inferences in order to determine the natural layout of the key features of the body portion. Once the natural layout of the key features are determined, the mathematical equations may be further applied to manipulate the geometric shape inferences to simulate various movements or positions. Next, the specific key features to be modified are identified. An input device such as a mouse, stylus, touch screen, etc., coupled to the digital computer 10 is used to adjust the position of the landmark points of the selected key features. Mathematical calculations are applied to determine passive changes to areas surrounding the changed key features. The program then generates a modified image which incorporates all active and passive changes to the body portion. The resulting image may then be transferred to various output devices such as a printer, projection equipment, etc.

It is to be understood that the present invention is not limited to the embodiments described above, but encompasses any and all embodiments within the scope of the following claims.

We claim:

1. A method of customizing a video game comprising the steps:
   inputting an image of a character having facial features from the video game into a digital computer;
   superimposing a coordinate grid on the image of the character;
   identifying landmark points for the character's facial features;
   inputting an image of a player having facial features into the digital computer;
   superimposing a coordinate grid on the image of the player;
   identifying landmark points for the player's facial features;
   applying mathematical equations to establish a natural layout of the character's face and player's face;
   replacing the character's facial features with corresponding facial features from the player for each frame to generate a resulting image; and
   accessing the resulting image of each frame by the video game during play.

2. A method of customizing a video game as recited in claim 1 further comprising the step of providing an option to use the image of the player.

3. A method of customizing a video game as recited in claim 1 wherein:
   the step of identifying landmark points for the character's facial features further comprises the step of creating an object for each facial feature of the character; and
   the step of identifying landmark points for the player's facial features further comprises the step of creating an object for each facial feature of the player.

4. A method of customizing a video game as recited in claim 1 wherein the step of inputting the representation of a character further comprises the steps:
   identifying all facial expressions for the character; and
   saving all identified facial expressions of the character in a first library file.

5. A method of customizing a video game as recited in claim 4 wherein:
   the step of superimposing a coordinate grid on the character is performed for each facial expression; and
   the step of identifying landmark points for the character's facial features is performed for each facial expression.

6. A method of customizing a video game as recited in claim 5 further comprising the step of creating a second library file containing landmark points for all facial expressions of the character.

7. A method of customizing a video game as recited in claim 6 further comprising the steps:
   accessing the second library file;
   retrieving landmark points for all facial expressions in the second library file;
   applying landmark points for the facial features of the second library to the corresponding features of the image of the player; and
   creating a third library file containing landmark points for all facial expressions of the player.

8. A method of customizing a video game as recited in claim 1 wherein:
   the step of inputting a representation of a character comprises the steps:
      inputting a frontal view of the character, and
      inputting a side view of the character; and
   the step of inputting a representation of the player comprises the steps:
      inputting a frontal view of the player, and
      inputting a side view of the player.

9. A method of customizing a video game as recited in claim 8 wherein the step of superimposing a coordinate grid on the image of the character comprises the steps:
   superimposing a first coordinate grid on the side view of the character; and
   superimposing a second coordinate grid on the frontal view of the character.

10. A method of customizing a video game as recited in claim 9 wherein:
    the step of superimposing a first coordinate grid on the side view of the character further comprises the step of moving the first coordinate grid having a first origin to align the first origin with a highest point of the side view of the character defined by the tip of the nose; and
    the step of superimposing a second coordinate grid having a second origin on the frontal view of the character further comprises the step of moving the second coordinate grid to align the second origin with the tip of the nose of the character;

whereby the first origin and second origin of said first and second coordinate grids are aligned with the tip of the nose of the character in three-dimensional space.

11. A method of customizing a video game as recited in claim 10 wherein the step of identifying landmark points for the character comprises the steps:

identifying landmark points on the first coordinate grid for facial features of the character using geometric shape inferences; and identifying landmark points on the second coordinate grid for facial features of the character using geometric shape inferences.

12. A method of customizing a video game as recited in claim 8 wherein the step of superimposing a coordinate grid on the image of the player comprises the steps:

superimposing a first coordinate grid on the side view of the player; and superimposing a second coordinate grid on the frontal view of the player.

13. A method of customizing a video game as recited in claim 12 wherein:

the step of superimposing a first coordinate grid on the side view of the player further comprises the step of moving the first coordinate grid having a first origin to align the first origin with a highest point of the side view of the player defined by the tip of the nose; and the step of superimposing a second coordinate grid having a second origin on the frontal view of the player further comprises the step of moving the second coordinate grid to align the second origin with the tip of the nose of the player;

whereby the first origin and second origin of said first and second coordinate grids are aligned with the tip of the nose of the player in three-dimensional space.

14. A method of customizing a video game as recited in claim 13 wherein the step of identifying landmark points comprises the steps:

identifying landmark points on the first coordinate grid for facial features of the player using geometric shape inferences; and identifying landmark points on the second coordinate grid for facial features of the player using geometric shape inferences.

* * * * *